US007801315B2

(12) United States Patent
Watanabe et al.

(10) Patent No.: US 7,801,315 B2
(45) Date of Patent: Sep. 21, 2010

(54) METHOD AND DEVICE FOR DRIVING A DIRECTIONAL SPEAKER

(75) Inventors: Makoto Watanabe, Saitama (JP); Mizuki Mori, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1664 days.

(21) Appl. No.: 11/013,692

(22) Filed: Dec. 17, 2004

(65) Prior Publication Data

US 2006/0291667 A1 Dec. 28, 2006

(30) Foreign Application Priority Data

Dec. 18, 2003 (JP) ............................ 2003-420392
Dec. 2, 2004 (JP) ............................ 2004-349719

(51) Int. Cl.
*H04B 3/00* (2006.01)

(52) U.S. Cl. .......................... 381/77; 381/80; 381/111

(58) Field of Classification Search ............ 381/77–85, 381/111, 387
See application file for complete search history.

(56) References Cited

U.S. PATENT DOCUMENTS

| | | | | |
|---|---|---|---|---|
| 4,332,978 | A * | 6/1982 | Streeter | 381/16 |
| 5,159,703 | A * | 10/1992 | Lowery | 455/42 |
| 6,678,381 | B1 * | 1/2004 | Manabe | 381/77 |
| 6,678,383 | B2 * | 1/2004 | Ito et al. | 381/174 |
| 6,807,281 | B1 * | 10/2004 | Sasaki et al. | 381/111 |
| 7,224,808 | B2 * | 5/2007 | Spencer et al. | 381/77 |
| 7,236,754 | B2 * | 6/2007 | Sorrells et al. | 455/118 |
| 2003/0108207 | A1 * | 6/2003 | Otsuka | 381/1 |
| 2003/0215103 | A1 * | 11/2003 | Norris et al. | 381/77 |

FOREIGN PATENT DOCUMENTS

| | | |
|---|---|---|
| JP | 3-159400 | 7/1991 |
| JP | 3-296399 | 12/1991 |

(Continued)

OTHER PUBLICATIONS

Japanese Notification of Reasons for Refusal dated Jun. 3, 2009, issued in corresponding Japanese patent application No. 2004-349719.

*Primary Examiner*—Devona E. Faulk
*Assistant Examiner*—Disler Paul
(74) *Attorney, Agent, or Firm*—Westerman, Hattori, Daniels & Adrian, LLP

(57) ABSTRACT

A directional speaker that vibrates a diaphragm to send sound waves includes reproducing signal generation means 10 for outputting a reproducing audible signal; ultrasonic signal generation means 20 for outputting a carrier wave signal at a frequency in an ultrasonic band; phase modulation means 30 for phase modulating the carrier wave signal with the reproducing audible signal to output a modulated carrier wave signal; and diaphragm driving means 50 for vibrating the diaphragm based on a compression cycle of the modulated carrier wave signal. The configuration, in which the ultrasonic carrier wave is modulated with an audio signal, can generate a small, narrow-directional audible sound field without using a parametric effect. At the same time, the ultrasonic carrier wave is modulated in such a way that the sound pressure distribution of a target audio signal (reproducing audible signal) can be obtained for output and, therefore, the sound quality of a sound signal output from the directional speaker is improved.

38 Claims, 27 Drawing Sheets

FOREIGN PATENT DOCUMENTS

| | | | |
|---|---|---|---|
| JP | 11-164384 | | 6/1999 |
| JP | 11-262084 | A | 9/1999 |
| JP | 2001-008281 | A | 1/2001 |
| JP | 2002-315088 | A | 10/2002 |
| JP | 2003-503868 | A | 1/2003 |
| JP | 2003-47085 | | 2/2003 |
| JP | 2004-274496 | A | 9/2004 |

* cited by examiner

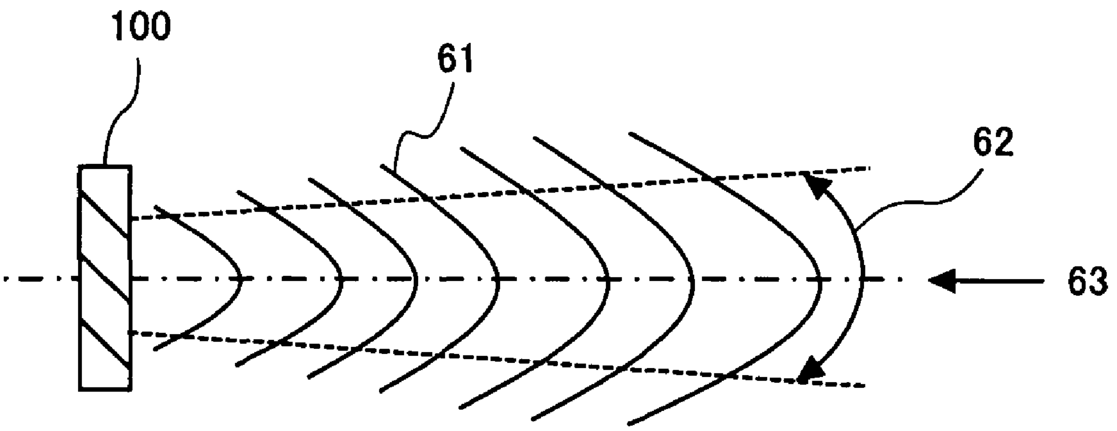
Fi.g 4

Fig. 6A Reproduced audible sound
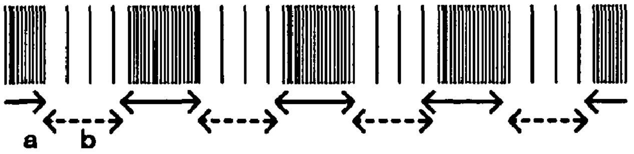
Fig. 6B Reproducing audible signal
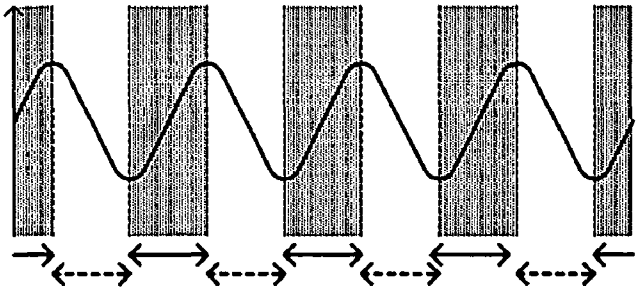
Fig. 6C Carrier wave
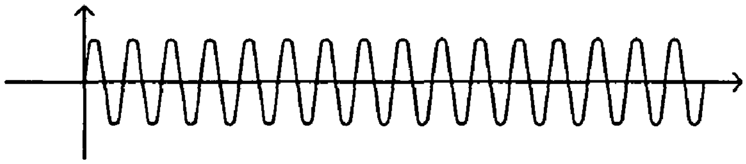
Fig. 6D Phase modulated wave
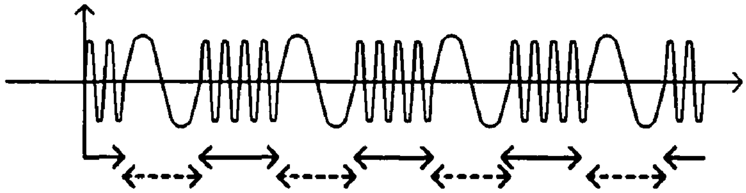
Fig. 6E Audible sound produced by phase modulated wave
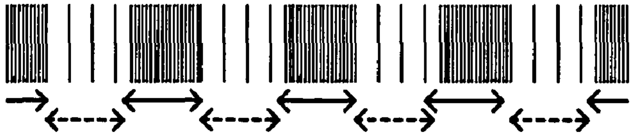

Fig. 7A Reproduced audible sound
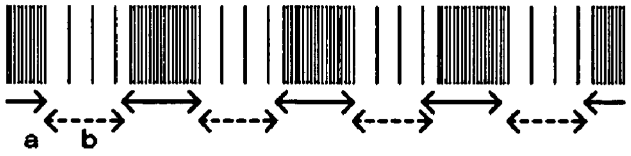
Fig. 7B Reproducing audible signal
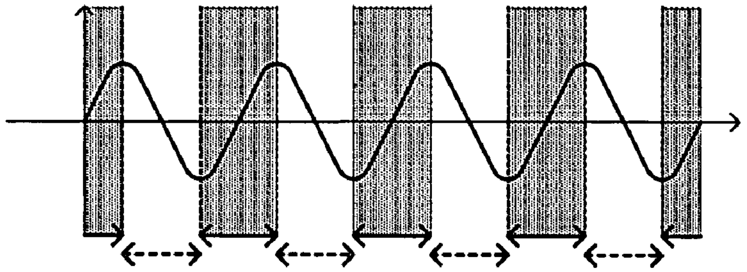
Fig. 7C Differentiation signal
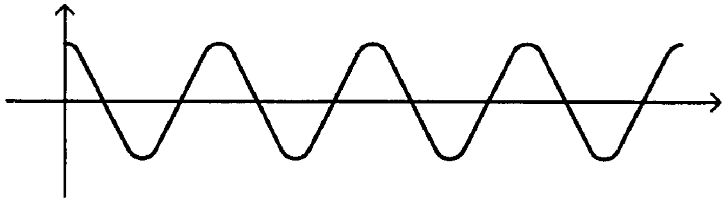
Fig. 7D Carrier wave
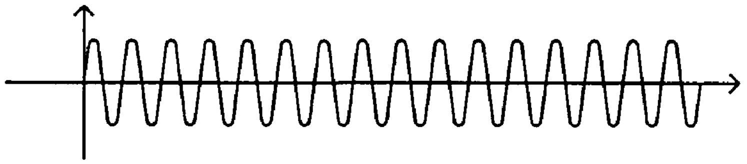
Fig. 7E Phase modulated wave
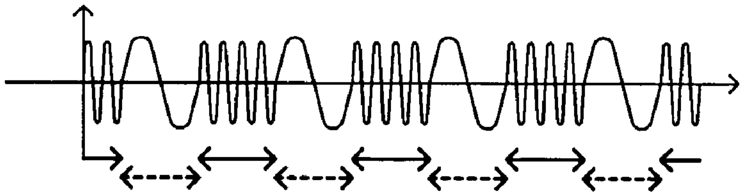
Fig. 7F Audible sound produced by phase modulated wave
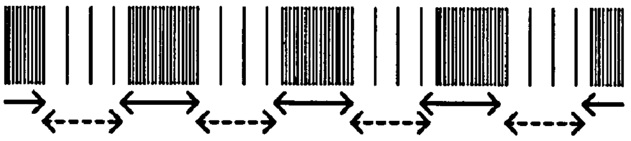

Reproduced audible sound
a
b

Reproducing audible signal

Slope signal

Carrier wave

Phase modulated wave

Audible sound produced by phase modulated wave

Reproduced audible sound
a
b

Reproducing audible signal

Carrier wave

Modulation interval

Phase modulated wave

Audible sound produced by phase modulated wave

Fig. 11A Reproduced audible sound
Fig. 11B Reproducing audible signal
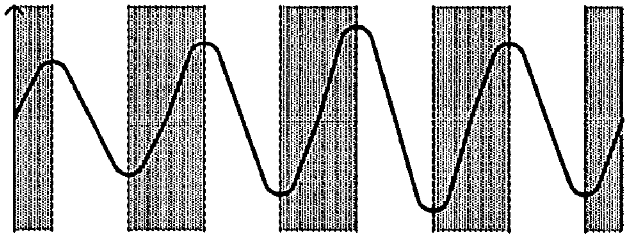
Fig. 11C Carrier wave
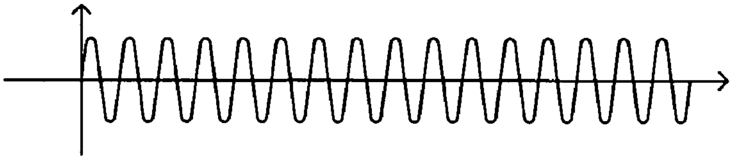
Fig. 11D Phase modulated wave
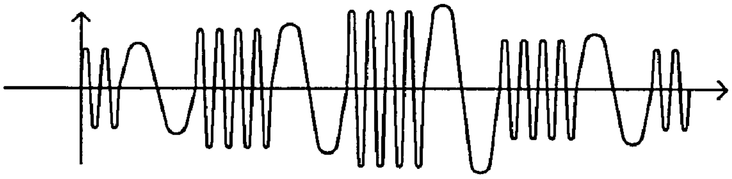
Fig. 11E Audible sound produced by phase modulated wave
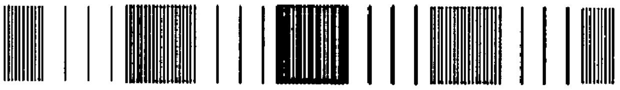

Duty ratio 1:1

Duty ratio where high period is long

Duty ratio where low period is long

Fig. 15A Reproduced audible sound
Fig. 15B Reproducing audible signal
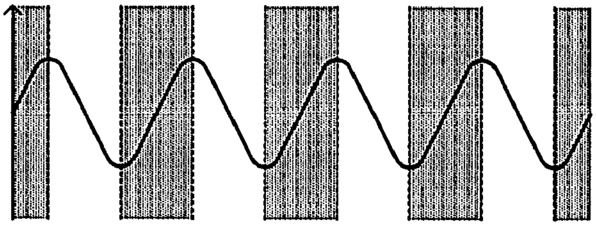
Fig. 15C Carrier wave (rectangular wave)
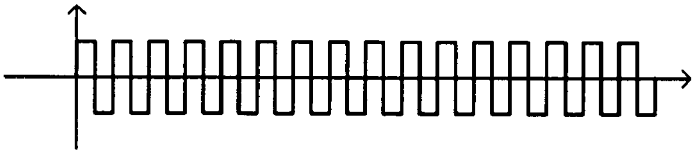
Fig. 15D Phase modulated wave
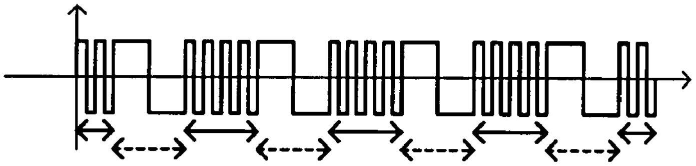
Fig. 15E Audible sound produced by phase modulated wave

Reproduced audible sound

Reproducing audible signal

Carrier wave (rectangular wave)

Phase modulated wave

Audible sound produced by phase modulated wave

Fig. 26A Reproduced audible sound
Fig. 26B Reproducing audible signal
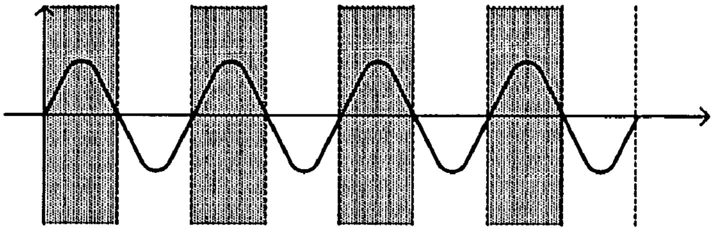
Fig. 26C Carrier wave
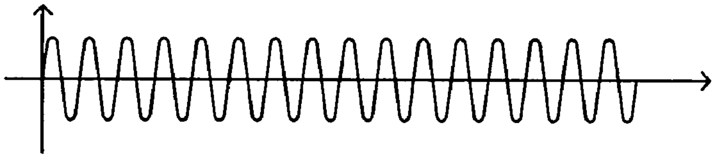
Fig. 26D Frequency modulated wave
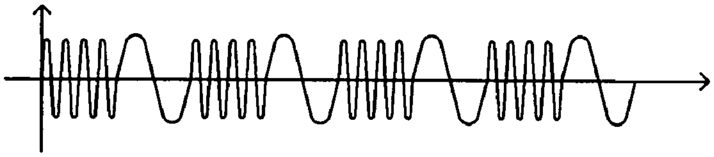
Fig. 26E Audible sound produced by phase modulated wave
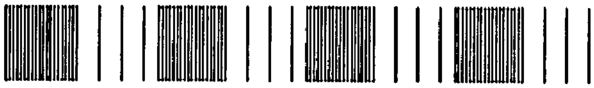

Reproduced audible sound

Reproducing audible signal

Carrier wave

Frequency modulated wave

Audible sound produced by phase modulated wave

METHOD AND DEVICE FOR DRIVING A DIRECTIONAL SPEAKER

BACKGROUND OF THE INVENTION

1. Field of the Invention

The present invention relates to a method and a device for driving a directional speaker that vibrates a diaphragm with an electric signal supplied from an external source to generate sound waves in the ultrasonic wave range. More particularly, the present invention relates to a method and a device for driving a directional speaker that generates an audible sound field using the narrow-directional characteristics that are characteristics of ultrasonic waves.

2. Description of the Prior Art

An ultrasonic speaker, which generates an audible field using the narrow-directional characteristics that are characteristics of ultrasonic waves, is known as a directional speaker. An ultrasonic speaker, mounted on an electronic device, utilizes the narrow-directional characteristics to give an effect that only the user can hear the sound.

One known ultrasonic speaker has a configuration in which many ultrasonic speakers are arranged in an array form to give directional characteristics through a parametric effect (see Patent Document 1).

The overview of this directional speaker will be described with reference to FIG. 23 and FIG. 24. FIG. 23 is a top plan view showing the configuration of a directional speaker, and FIG. 24 is a cross section diagram showing the configuration of an ultrasonic speaker of the directional speaker.

As shown in FIG. 23, a directional speaker 109 is an ultrasonic speaker array configured by arranging a plurality of ultrasonic speakers 100, each generating many ultrasonic waves, in an array form on a printed circuit board 108. Inputting ultrasonic signals, amplitude demodulated with audible signals, into this ultrasonic speaker array generates a directional sound field.

Using the modulated signal generated by amplitude modulating the ultrasonic signal that is the carrier wave, the directional speaker 109 shown in this figure drives the ultrasonic speaker 100 with an audible sound and outputs ultrasonic waves. The ultrasonic waves, which are output from the ultrasonic speaker 100, generate secondary audible sound waves of audible sounds through the non-linear phenomenon of ultrasonic waves while traveling through air and give a parametric effect.

As shown in FIG. 24, each of the ultrasonic speakers 100 forming the directional speaker 109 is structured in such a way that electrodes 102 are fixed on a base 101 and, at the tips of the electrodes 102, a diaphragm 104 is pasted using an insulating adhesive 103. In addition, a piezoelectric element 105 is pasted on the diaphragm 104 as a vibration generator. In some cases, a resonator 106 is pasted on the piezoelectric element 105 in order to increase the sound pressure of emitted sound. Furthermore, the piezoelectric element 105 is connected to the electrodes 102 via lead wires 107 so that the piezoelectric element 105 can be vibrated by signals sent from an external electric circuit (not shown).

The directional speaker described above, which generates secondary sound waves from ultrasonic waves through the parametric effect, has the problem that the efficiency of conversion from ultrasonic waves to audible sounds during audible sound reproduction is low. This makes it difficult to reproduce audible sounds using one ultrasonic speaker 100 and, as a result, many ultrasonic speakers 100 must be arranged in an array form as shown in FIG. 23. Because the speaker device becomes large, it becomes difficult to mount a directional speaker, configured in an array form, on a small electronic device or a portable terminal.

In addition to the directional speaker configured in an array form described above, a directional speaker using ultrasonic waves as carrier waves is also proposed. One of such directional speakers has a configuration in which ultrasonic carrier waves are amplitude modulated with sound signals and the resulting modulated signals are output from the ultrasonic resonator as a sound (for example, see Patent Documents 2 and 3).

The directional speaker using amplitude modulation described above has a problem that a sound with a high sound pressure cannot be generated. To solve this problem, the configuration that increases the output, for example, the configuration that increases the gain of the amplifier, is required.

Another directional speaker, which uses the ultrasonic wave as the carrier wave, is also proposed. This speaker frequency modulates the carrier wave, which is the ultrasonic wave, with the sound signal and outputs the resulting modulated signal from the ultrasonic resonator as a sound (for example, see Patent Document 4).

FIG. 25 is a block diagram showing the configuration of a directional speaker that uses frequency modulation. This directional speaker comprises sound generating means 110, ultrasonic wave generating means 120 for generating ultrasonic carrier waves, frequency modulation means 130 for frequency modulating ultrasonic waves generated by the ultrasonic generating means 120 with a sound signal generated by the sound generating means 110, amplifying means 140 for amplifying the modulated signal modulated by the frequency modulation means 130, and electric sound conversion means 150 for converting a modulated signal to a sound signal.

The above-described directional speaker described in Patent Document 4 generates a sound vibration in which the ultrasonic wave and the audible signal, emitted from the electric sound conversion means 150, are mixed as described in the document. As this sound vibration propagates through air as an ultrasonic wave, non-linear interaction occurs and the sound vibration is demodulated to an ultrasonic sound composed of low-frequency components.

[Patent Document 1]

Japanese Patent Laid-Open Publication No. 2003-47085 (FIGS. 1-2 in page 3)

[Patent Document 2]

Japanese Patent Laid-Open Publication No. Hei 3-159400

[Patent Document 3]

Japanese Patent Laid-Open Publication No. Hei 3-296399

[Patent Document 4]

Japanese Patent Laid-Open Publication No. Hei 11-164384

The inventor of this application has found that the audible sound obtained from a speaker with a configuration in which frequency modulation is used, such as the conventional directional speaker described in Patent Document 4 described above, is lower in the sound quality than that of the target sound signal to be output. This is because the sound pressure of an audible sound obtained by driving a frequency modulated wave with an ultrasonic speaker differs from the sound pressure of the target sound to be output.

FIG. 26 is a diagram showing how the sound pressure of an audible sound, obtained from a conventional frequency-modulation-based directional speaker, changes.

FIG. 26A shows the sound pressure distribution of a target sound to be output. A listener recognizes the sound pressure distribution, composed of a repetition of the high sound pressure part a and the low sound pressure part b, as a sound. FIG.

26B shows the sound signal of this sound. In this figure, the sound signal is represented by a sign wave signal at a predetermined frequency.

Frequency modulating the ultrasonic carrier wave shown in FIG. 26C with the sound signal shown in FIG. 26B gives the frequency modulated wave shown in FIG. 26D. Driving the diaphragm with this frequency modulated wave gives the audible sound with the sound pressure distribution shown in FIG. 26E.

Comparison between the sound pressure distribution of the target sound shown in FIG. 26A with the sound pressure distribution obtained from the frequency modulation shown in FIG. 26E indicates that the sound pressure distributions are different. A listener, who listens to the audible sound obtained from this frequency modulation, feels that the sound quality is degraded because of a change in the sound pressure distribution.

FIG. 27 shows a case in which the sound pressure of the target sound to be output is varied. Because the sound signal is at a fixed frequency in FIG. 26, the difference between the sound pressure distribution of the target sound shown in FIG. 26A and the sound pressure distribution obtained from the frequency modulation shown in FIG. 26E only appears to be a shift in phase. On the other hand, comparison between the sound pressure distribution of the target sound shown in FIG. 27A with the sound pressure distribution obtained from the frequency modulation shown in FIG. 27E, which is similar to the comparison in FIG. 26 described above, indicates more apparently that the sound pressure distributions are different.

As described above, the conventional directional speaker that uses a parametric effect has a problem that the speaker becomes large. The conventional directional speaker that amplitude modulates an ultrasonic carrier wave has a problem that it is difficult to obtain a high sound pressure.

The conventional directional speaker that frequency modulates an ultrasonic carrier wave has a problem that it is difficult to produce a good quality sound.

OBJECTS AND SUMMARY OF THE INVENTION

It is an object of the present invention to solve the problems described above and create a narrow-directional audible sound field using a small speaker array in which one or more ultrasonic speakers are arranged and to provide a method a device for driving a directional speaker that can produce a good quality sound.

The configuration, in which the ultrasonic carrier wave is modulated with an audio signal, can generate a small, narrow-directional audible sound field without using a parametric effect. At the same time, the ultrasonic carrier wave is modulated in such a way that the sound pressure distribution of a target audio signal (reproducing audible signal) can be obtained for output and, therefore, the sound quality of an sound signal output from the directional speaker is improved.

A method and a device for driving a directional speaker according to the present invention has two modulation modes for producing a sound pressure distribution similar to that of a reproducing audible signal: a first phase modulation mode in which the carrier wave signal is phase modulated with the differentiation signal generated by differentiating the reproducing audible signal and a second phase modulation mode in which the carrier wave signal is phase modulated based on the slope of the reproducing audible signal.

According to the present invention, the carrier wave signal is phase modulated with the reproducing audible signal to produce a modulated carrier wave signal. A directional speaker that vibrates a diaphragm to send sound waves comprises reproducing signal generation means for outputting a reproducing audible signal; ultrasonic signal generation means for outputting a carrier wave signal at a frequency in an ultrasonic band; phase modulation means for phase modulating the carrier wave signal with the reproducing audible signal to output a modulated carrier wave signal; and diaphragm driving means for vibrating the diaphragm based on a compression cycle of the modulated carrier wave signal.

The phase modulation means phase modulates the carrier wave signal at a frequency in the ultrasonic band, output by the ultrasonic signal generation means, with the reproducing audible signal output from the reproducing signal generation means. The diaphragm is vibrated based on the compression cycle of the modulated carrier wave signal, obtained through the phase modulation, to send sound waves. This phase modulation causes the directional speaker to produce a sound pressure distribution similar to that of the reproducing audible signal.

Note that the carrier wave signal is a signal wave at a frequency of 40 kHz to 100 kHz, and the phase modulation means phase modulates the carrier wave signal with a modulation phase in a range from 0.1 rad to 25 rad.

The phase modulation in the first mode according to the present invention is the first phase modulation mode in which the carrier wave is phase modulated with the differentiation signal of the reproducing audible signal. The first phase modulation means comprises a differentiation circuit that differentiates the reproducing audible signal; and a frequency modulation circuit that frequency modulates the carrier wave signal with an output signal from the differentiation circuit.

The phase modulation in the second mode according to the present invention is the second phase modulation mode in which the carrier wave signal is modulated based on the slope of the reproducing audible signal. The second phase modulation means modulates the carrier wave signal based on the slope at a high density in a rising signal part of the reproducing audible signal and modulates the carrier wave signal at a low density in a falling signal part of the reproducing audible signal.

The mode, in which the carrier wave signal is modulated at a high or low density according to the signal rising or falling part, is carried out in one of the following two ways. In one way, the carrier wave signal is modulated at a high density according to the signal width of the rising part of the reproducing audible signal, and at a low density according to the signal width of the falling part of the reproducing audible signal. In the other way, the carrier wave signal is modulated at a high density according to the rising rate of the rising part of the reproducing audible signal, and at a low density according to the falling rate of the falling part of the reproducing audible signal.

It is also possible to modulate the carrier wave signal only for the rising signal part of the reproducing audible signal. Because a listener usually recognizes an audio in the high sound pressure part of the sound pressure distribution but not so much in the low sound pressure part, it would be enough to modulate the carrier wave signal only for the rising signal part of the reproducing audible signal from which a high sound pressure is generated. This reduces the power consumption.

In the first and second modes according to the present invention described above, it is possible to use a rectangular wave for the carrier wave signal and to set its duty ratio to a predetermined value to increase the sound quality.

When a rectangular wave is used for the carrier wave signal and its duty ratio (ratio of high time duration to low time duration) is low (high time ratio is low), it becomes difficult to hear a sound because the sound pressure of an audible sound becomes low. Conversely, when the duty ratio is high (high time ratio is high), it becomes difficult to identify an audible sound because the sound pressure of a higher harmonic wave exceeds the sound pressure of an audible sound.

In view of this, the duty ratio of the rectangular wave is set to a value such that the sound pressure in the wavelength area of the reproducing audible signal is higher than the sound pressure of a higher harmonic wave component.

For example, the carrier wave signal is a rectangular wave at a frequency of 40 kHz to 100 kHz and the duty ratio of the rectangular wave is selected from values ranging from 20% to 80%. When the duty ratio of the rectangular wave falls below 20%, it becomes difficult to hear a sound because the sound pressure of an audible sound becomes low. Conversely, when the duty ratio exceeds 80%, it becomes difficult to identify an audible sound because the sound pressure of a higher harmonic wave exceeds the sound pressure of an audible sound. Therefore, for example, a carrier wave signal with the duty ratio of 60% is selected from carrier wave signals with the duty ratio of 20% to 80%.

In the first and second modes according to the present invention described above, the frequency characteristics of the modulated carrier wave signal obtained trough the modulation can be adjusted to improve the sound quality.

As means for adjusting the frequency characteristics of the modulated carrier wave signal, a filter is provided between the modulation means and the diaphragm driving means for passing a predetermined frequency component of the modulated carrier wave signal. The passing area of the filter is a frequency area that does not include a resonance point in sound pressure characteristics for the frequency of the diaphragm driving means.

The diaphragm driving means has a resonance point for the frequency, and the slope of the sound pressure characteristics changes across this resonance frequency. Therefore, when modulation is performed in the frequency band across the resonance point, the linearity for the sound pressure frequency is lost and the sound quality is affected. By setting up a frequency band for the filter so that this resonance point is not included, the effect of non-linearity on the sound pressure frequency can be removed.

As means for adjusting the frequency characteristics of the modulated carrier wave signal, amplitude change means is provided between the modulation means and the diaphragm driving means. Based on the amplitude characteristics for the frequency of the amplitude change means, the sound pressure characteristics for the frequency of the diaphragm driving means are changed to predetermined sound pressure characteristics.

The configuration, in which a rectangular wave is used for the carrier wave signal, and the filter and the amplitude change means provided for adjusting the frequency characteristics of the modulated carrier wave signal, which are described above, can be used not only for the above-described phase modulation modes but also for frequency modulation.

In the mode in which a rectangular wave is used for frequency modulation, a directional speaker that vibrates a diaphragm to send sound waves comprises reproducing signal generation means for outputting a reproducing audible signal; ultrasonic signal generation means for outputting a carrier wave signal at a frequency in an ultrasonic band; angle modulation means for modulating the carrier wave signal with the reproducing audible signal to output a modulated carrier wave signal; and diaphragm driving means for vibrating the diaphragm based on a compression cycle of the modulated carrier wave signal, wherein the carrier wave signal is a rectangular wave at a frequency of 40 kHz to 100 kHz and the duty ratio of the rectangular wave is a value selected from a range 20% to 80%. The carrier wave signal is modulated with the modulation frequency of 0.1 kHz to 30 kHz.

In the configuration in which a filter is applied to frequency modulation, a directional speaker that vibrates a diaphragm to send sound waves comprises reproducing signal generation means for outputting a reproducing audible signal; ultrasonic signal generation means for outputting a carrier wave signal at a frequency in an ultrasonic band; angle modulation means for modulating the carrier wave signal with the reproducing audible signal to output a modulated carrier wave signal; diaphragm driving means for vibrating the diaphragm based on a compression cycle of the modulated carrier wave signal; and a filter, provided between the angle modulation means and the diaphragm driving means, for passing a predetermined frequency component of the modulated carrier wave signal, wherein the passing area of the filter is set to a frequency area that does not include a resonance point in sound pressure characteristics for the frequency of the diaphragm driving means.

In the configuration in which amplitude modulation is applied to frequency modulation, a directional speaker that vibrates a diaphragm to send sound waves comprises reproducing signal generation means for outputting a reproducing audible signal; ultrasonic signal generation means for outputting a carrier wave signal at a frequency in an ultrasonic band; angle modulation means for modulating the carrier wave signal with the reproducing audible signal to output a modulated carrier wave signal; diaphragm driving means for vibrating the diaphragm based on a compression cycle of the modulated carrier wave signal; and amplitude change means provided between the angle modulation means and the diaphragm driving means wherein, based on amplitude characteristics for the frequency of the amplitude change means, sound pressure characteristics for the frequency of the diaphragm driving means are corrected to predetermined sound pressure characteristics.

According to the present invention, an increase in the efficiency of conversion from ultrasonic waves to audible sounds makes it possible to create a directional speaker without using many ultrasonic speakers. This reduces the size of a device in which this directional speaker is mounted and allows a directional speaker to be mounted in a portable electronic device in which an ultrasonic speaker cannot conventionally be mounted.

In addition, according to the present invention, an audible sound can be reproduced only in a specific frequency area. This feature allows the present invention to be applied to an electronic device with which only the user can hear a sound. Therefore, a narrow-directional audible sound field can be generated by a compact speaker array composed of one or a few ultrasonic speakers.

According to the present invention, a directional speaker can produce a good-quality sound.

BRIEF DESCRIPTION OF THE DRAWINGS

The objects and features of the present invention described above will be made more apparent by the following detailed description that refers to the accompanying drawings, wherein:

FIG. 4 is a diagram showing the principle of directional sound field generation;

FIGS. 6A-6E are diagrams showing the signals and the sound pressure distribution in the mode according to the present invention in which a carrier wave signal is phase modulated with a reproducing audible signal;

FIGS. 7A-7F are diagrams showing the signals and the sound pressure distribution according to the present invention in which a carrier wave signal is phase modulated with a reproducing audible signal using a differentiation circuit;

FIGS. 11A-11F are diagrams showing the signals and the sound pressure distribution in a mode according to the present invention in which the amplitude of a reproducing audible varies;

FIGS. 15A-15E are diagrams showing the signals and the sound pressure distribution when the rectangular wave has a duty ratio of 1:1;

FIGS. 26A-26E are diagrams showing a change in the sound pressure of an audible sound obtained from a conventional directional speaker that uses frequency modulation.

DETAILED DESCRIPTION OF THE PREFERRED EMBODIMENTS

Figure 24:
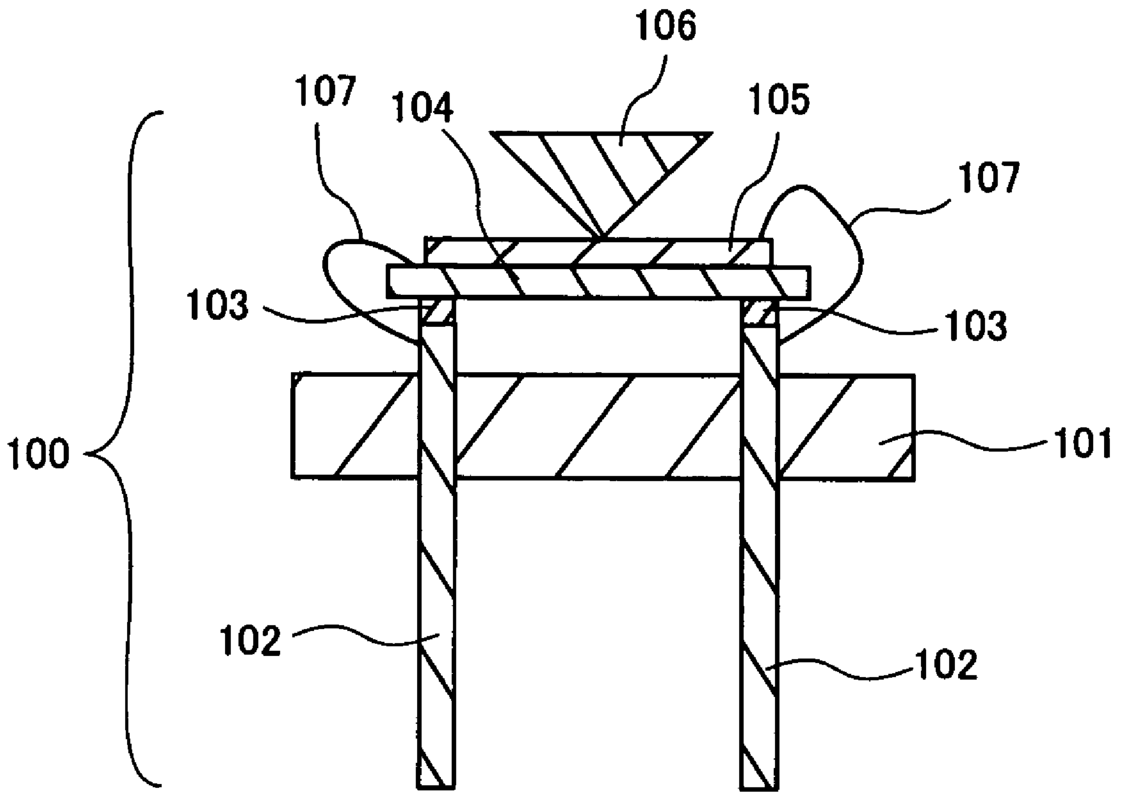
FIG. 24 is a cross section diagram showing the configuration of an ultrasonic speaker of the directional speaker.
Figure 25:
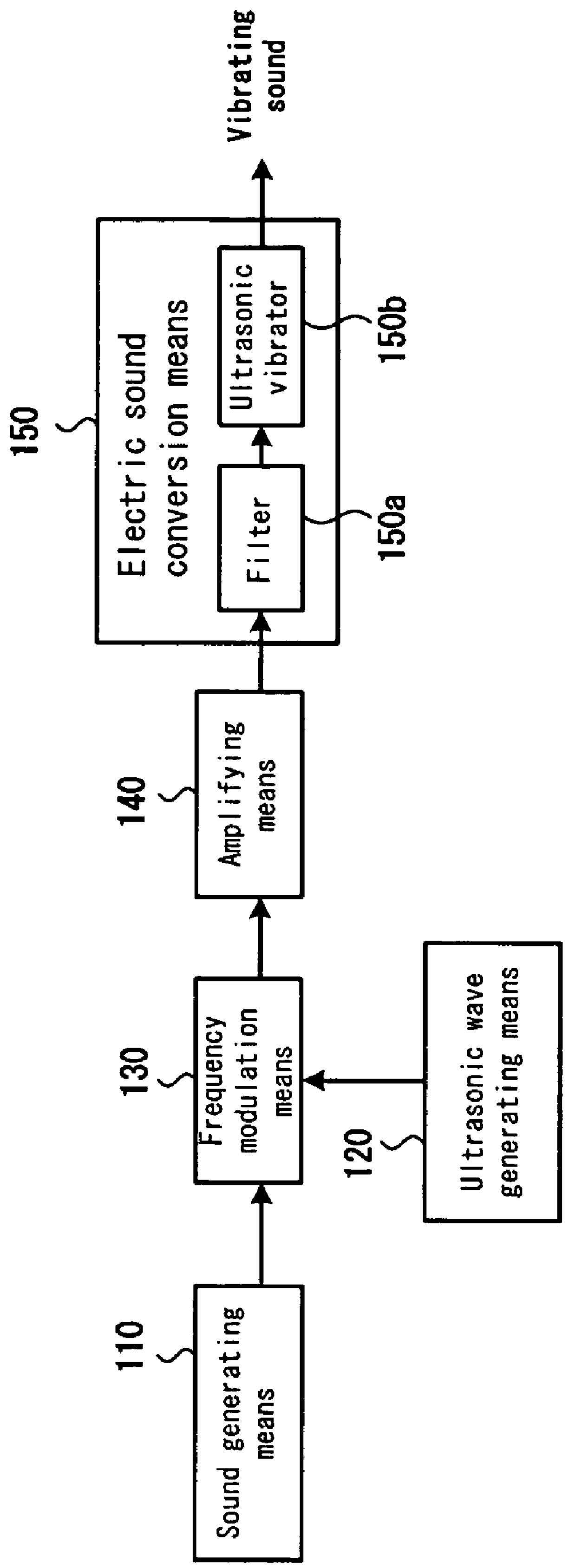
FIG. 25 is a block diagram showing the configuration of a directional speaker that uses frequency modulation.
Figures 27A, 27B, 27C, 27D, 27E:
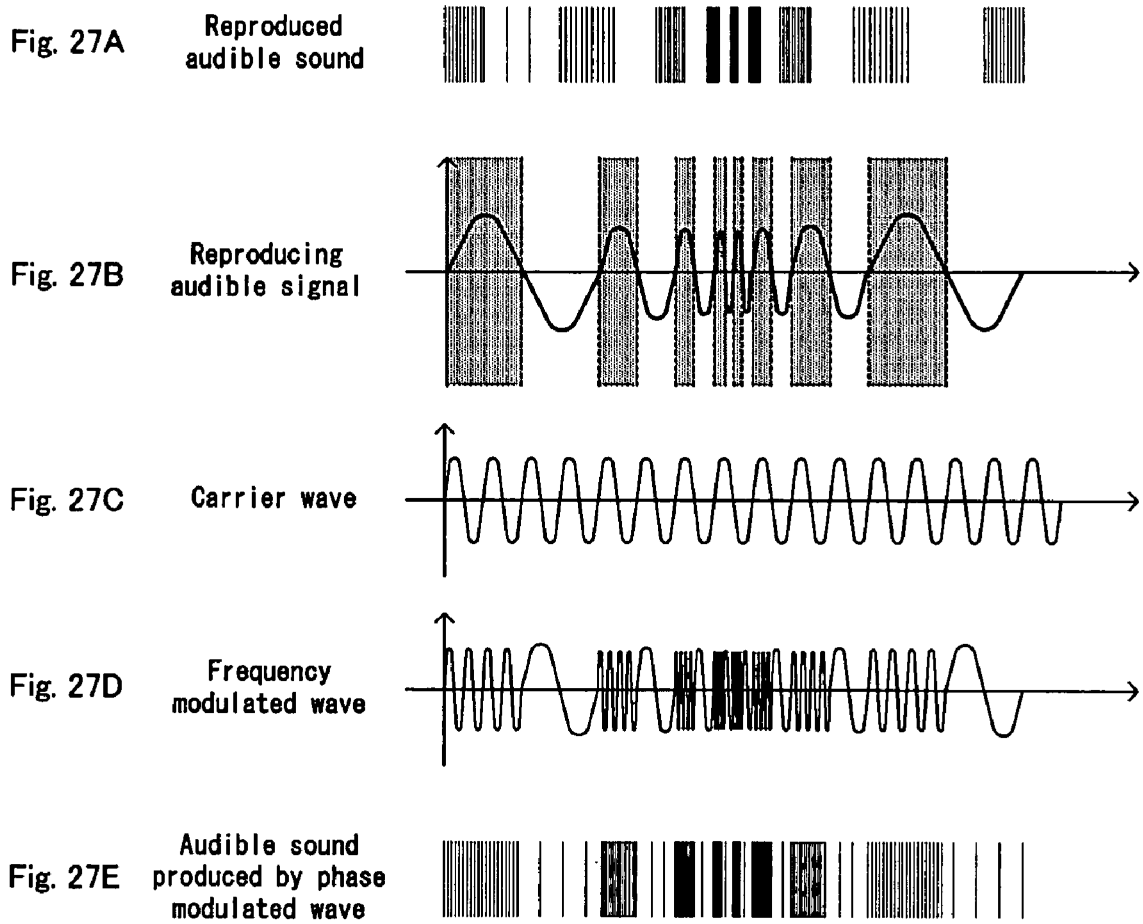
FIGS. 27A-27E are diagrams showing a change in the sound pressure signal and the sound pressure distribution of a reproducing audible sound.

A method for driving a directional speaker in a preferred embodiment of the present invention and a directional speaker using the method will be described below with reference to the drawings. Although the speaker structure shown in FIG. 24 described in the Background of the Invention is used basically for the method for driving a directional speaker according to the present invention described below, it should be noted that the method can be applied also for an ultrasonic speaker with some other configuration.

Figure 1:
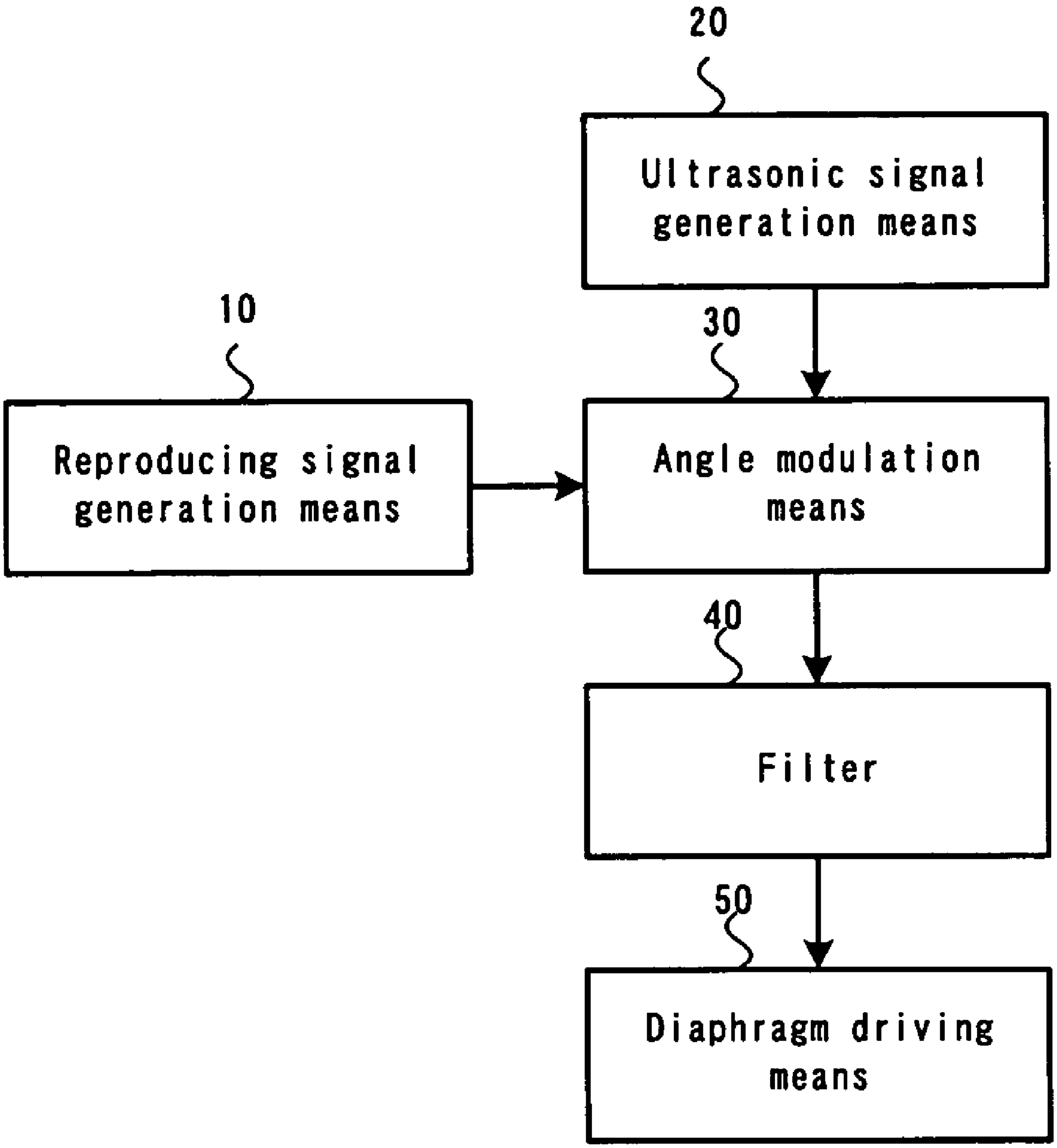
FIG. 1 is a general diagram showing the configuration of a directional speaker according to the present invention and its driving method.

First, with reference to FIG. 1, the configuration of the directional speaker and the method for driving the directional speaker according to the present invention will be outlined. FIG. 1 is a general diagram showing the configuration of the directional speaker according to the present invention and its driving method.

The directional speaker according to the present invention shown in this figure comprises reproducing signal generation means 10 that is the source of an audible sound to be reproduced; ultrasonic signal generation means 20 for generating an ultrasonic wave used as the carrier wave signal; angle modulation means 30 for phase modulating the carrier wave signal with a signal, generated by the reproducing signal generation means 10, for producing a modulated carrier wave; and diaphragm driving means 50 for vibrating a diaphragm based on the compression cycle of the modulated carrier wave signal. The diaphragm driving means 50 vibrates a diaphragm (not shown) to output an ultrasonic wave. A filter 40, which passes a signal at a predetermined frequency, may also be provided between the angle modulation means 30 and the diaphragm driving means 50.

If the output of this diaphragm driving means 50 is low, it is also possible to provide an amplifier (not shown), which amplifies the modulated carrier wave signal, between the angle modulation means 30 and the diaphragm driving means 50 to amplify the electrical signal.

Figure 2A:
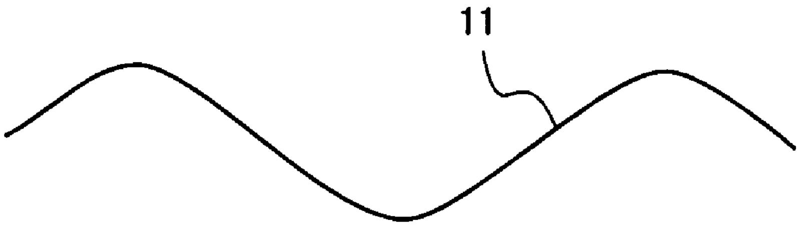
FIG. 2A is a diagram showing a reproducing audible signal used in the description of phase modulation used for the directional speaker according to the present invention.
Figure 2B:
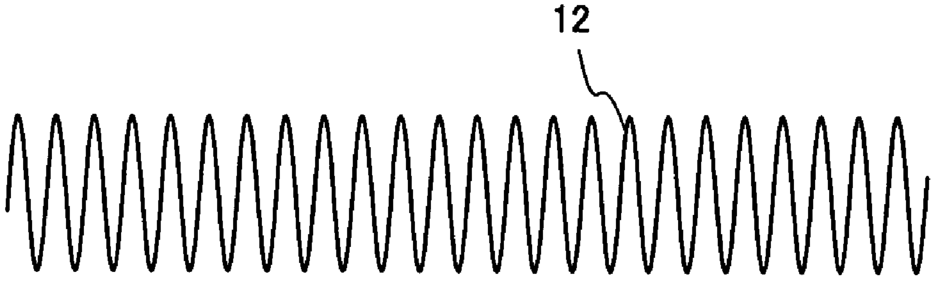
FIG. 2B is a diagram showing a carrier wave signal used in the description of phase modulation used for the directional speaker according to the present invention.
Figure 2C:
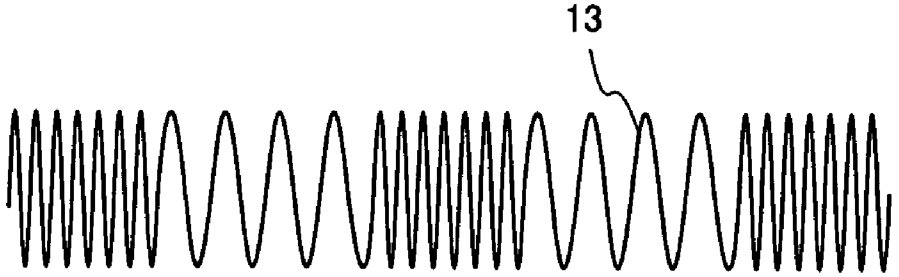
FIG. 2C is a diagram showing a modulated carrier wave signal used in the description of phase modulation used for the directional speaker according to the present invention.

FIGS. 2A-2C are diagrams showing the phase modulation used in the directional speaker. FIG. 2A is a diagram showing a reproducing audible signal, FIG. 2B is a diagram showing a carrier wave signal, and FIG. 2C is a diagram showing a modulated carrier wave signal.

The following describes angle modulation. The angle modulation means 30 angle-modulates a carrier wave signal 12 (FIG. 2B) in the ultrasonic band with a reproducing audible signal 11 (FIG. 2A) from the reproducing signal generation means 10, which is the source of the audible sound, through frequency modulation or phase modulation according to the present invention and creates a modulated carrier wave signal 13 (FIG. 2C).

Although the directional speaker according to the present invention increases sound quality through phase modulation, the following describes angle modulation including frequency modulation because frequency modulation is used in a part of the modulation when phase modulation is performed by combining frequency modulation with differentiation. The modulated carrier wave signal 13 is generated by modulating the ultrasonic carrier wave signal 12, which is a constant period signal, based on the amplitude of the reproducing audible signal 11 and, as a result, the modulated signal with a varying period is generated. In the description below, the amplitude of the waveform is assumed to be the same.

To frequency modulate the carrier wave signal during angle modulation, the angle frequency of the carrier wave signal 12 is made to change in proportion to the amplitude of the AC signals of the reproducing audible signal 11 in FIG. 2A to create the modulated carrier wave signal 13 that is a carrier wave signal whose frequency density changes.

Preferably, the modulated carrier wave signal 13 in the ultrasonic band used in the present invention has a frequency from 40 kHz to 100 kHz. In general, a frequency band where human ears cannot hear, that is, higher than 18 kHz to 20 kHz, is called an ultrasonic wave. However, because the frequency of the carrier wave signal lower than 40 kHz is too close to the audible sound frequency, the degree of change in the frequency of the carrier wave signal, generated by modulating the carrier wave signal with the reproducing audible signal described above, is low. Therefore, in this frequency band, it is difficult to reproduce the audible sound practically recognizable by the user. Even if reproduced, the modulated carrier wave signal has a sound pressure that is too low for the user to hear.

Conversely, if a carrier wave signal with a frequency band higher than 100 kHz is used, an audible sound can be reproduced through frequency modulation or through the phase modulation according to the present invention. However, because the difference between the vibration of the carrier wave signal and the vibration of the modulated part is too large, the user hears a sound that gets distorted. Therefore, it is not suitable for using a carrier wave signal in such a high frequency band to reproduce a dull sound (a sound that should be heard).

Another disadvantage with the carrier wave signal 12 higher than 100 kHz is that the power consumption becomes large because the ultrasonic signal generation means 20 generates a high-frequency signal. For the reasons described above, the carrier wave signal 12 higher than 100 kHz is not desirable, because mounting a directional speaker in a portable electronic device, which is one of uses of the present invention, is difficult.

In addition, for the frequency modulation described above, it is preferable to frequency modulate the carrier wave with a modulation frequency of 0.1 kHz to 30 kHz. This is because, when the modulation frequency is adjusted according to a reproducing audible sound in order to reproduce non-distorted, clear audible sound, a modulation frequency higher than 30 kHz would increase the modulation degree, and the audible sound gets so distorted due to a large distortion, with the result that the user feels it difficult to hear. A frequency lower than 0.1 kHz, which is too low, would decrease the modulation degree to a degree that is too low for an audible sound to be reproduced.

Phase modulation, usable instead of frequency modulation described above, is a form of modulation in which the phase of the carrier wave signal 12 is caused to vary in proportion to the amplitude of the AC signal of the reproducing audible signal 11 for creating the modulated carrier wave signal 13 where the density of carrier wave changes. Any one of those two modulation methods described above can convert the carrier wave signal 12 to the modulated carrier wave signal 13 that is the carrier wave signal 12 having a compressional part.

For the same reason described above, it is also preferable to use the frequency of 40 kHz to 100 kHz described above for the carrier wave signal 12 in the ultrasonic band used in this embodiment.

Although phase modulation can be carried out in the range to several hundred rad when the phase modulation described above is used, the carrier wave should preferably be modulated in the range 0.1 rad to 25 rad. This is because, when the modulation phase is adjusted according to an audible sound to be reproduced for reproducing non-distorted, clear audible sound, a modulation at a rad level higher than 25 rad would increase the distortion of audible sound to be reproduced with the result that the audible sound gets so distorted for the audible sound to be reproduced clearly. A modulation lower than 0.1 rad is too low for an audible sound to be reproduced.

Figure 3A:
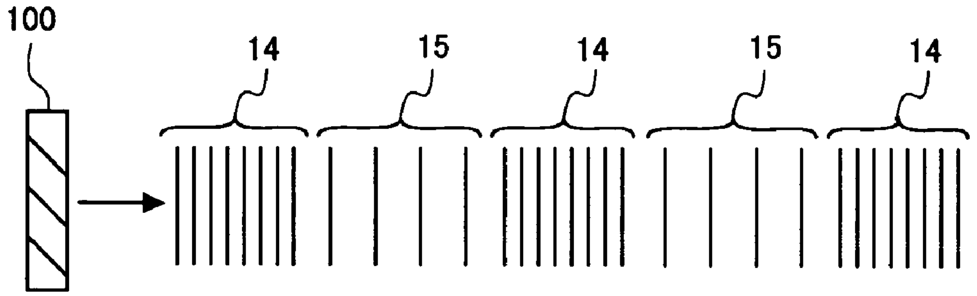
FIG. 3A is a diagram showing the compression cycle status of the modulated carrier wave signal of an ultrasonic wave output from the directional speaker according to the present invention.
Figure 3B:
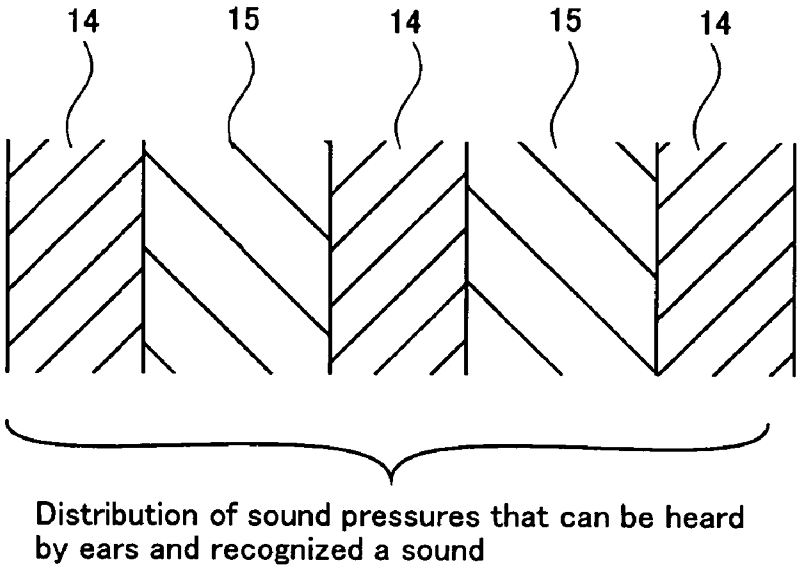
FIG. 3B is a diagram showing the distribution of sound pressure whose compression cycles can be heard by a user.

Next, the principle of audible sound reproduction will be described with reference to FIGS. 3A and 3B. FIG. 3A is a diagram showing the compression cycle status of the modulated carrier wave signal of an ultrasonic wave output from the directional speaker according to the present invention. FIG. 3B is a diagram showing the distribution of sound pressure whose compression cycles can be heard by the ears of the user.

When the modulated carrier wave signal 13 is applied to the diaphragm driving means 50 in the ultrasonic speaker 100, the diaphragm vibrates to generate air compressions in air (FIG. 3B) and generates the air pressures according to the waveform of the modulated carrier wave signal 13 shown in FIG. 2C. As a result, the modulated carrier wave signal 13 emitted into air generates a high air pressure part 14 at a high vibration density in the ultrasonic band and a low air pressure part 15 at a low vibration density (FIG. 3A).

When this waveform reaches the ears of a listener, the listener can hear only the air pressure vibrations in the audible band, not the air pressure vibrations in the ultrasonic band. Therefore, as shown in FIG. 3B, the listener recognizes the high air pressure part 14 and the low air pressure part 15 as areas of different air pressures and hears a change in this area as a sound.

This is because the ears of a listener work as a sort of a low pass filter and the listener of this directional speaker can get the vibrations in the audible band from the vibrations in the ultrasonic band.

The principle of directional sound field generation will be described with reference to FIG. 4. FIG. 4 is a schematic diagram showing the principle of the directional characteristics of a directional speaker according to the present invention.

It is generally known that, as the vibration frequency of a flat plate is gradually increased from the audible band to the ultrasonic band, a high sound pressure area 62 where a sound pressure 61 is high concentrates in an area around a central axis 63 of the vibrating flat plate. This phenomenon applies also to a directional speaker. Because the sound pressure becomes extremely low outside the high sound pressure area 62, the sound wave output from the ultrasonic speaker 100 cannot propagate a long distance outside the high sound pressure area 62. Therefore, in a location distant from the ultrasonic speaker 100, a sound propagates only in the high sound pressure area 62 and, as a result, the ultrasonic speaker 100 has narrow-directional characteristics.

Because the modulated carrier wave signal 13 output from the ultrasonic speaker 100 is vibrations in the ultrasonic band as described above, the ultrasonic wave propagating forward from the ultrasonic speaker 100 does not spread widely but has a narrow-directional characteristics.

Therefore, the listener of the directional speaker can hear an audible sound only in a narrow range where the modulated carrier wave signal propagates, but not in an area outside this range.

As described in the problems to be solved by the present invention, the inventor of this application has found that, for the audible sound obtained through frequency modulation such as the one output from a conventional directional speaker, the reproducing audible sound to be output does not match its sound pressure distribution and that the mismatch in the sound pressure distribution degrades the sound quality. Considering this fact, the inventor has invented the configuration of a directional speaker and its driving method for carrying out a modulation that produces a sound pressure distribution that matches the sound pressure distribution of a target reproducing audible sound to be output. This directional speaker and its driving method give a sound pressure distribution that matches the that of a reproducing audible sound to be output, thus increasing the quality of a sound output from the directional speaker.

The present invention provides two modes of modulation for producing the sound pressure distribution of this reproducing audible signal: in a first mode, the carrier wave signal is phase modulated with a reproducing audible signal, and in a second mode the carrier wave signal is modulated based on the slope of a reproducing audible signal.

First, the first mode in which the carrier wave signal is phase modulated with the reproducing audible signal will be described. In the first mode, the carrier wave signal is phase modulated with the reproducing audible signal. The following describes the configuration of this first mode with reference to FIG. 5.

Figure 5:
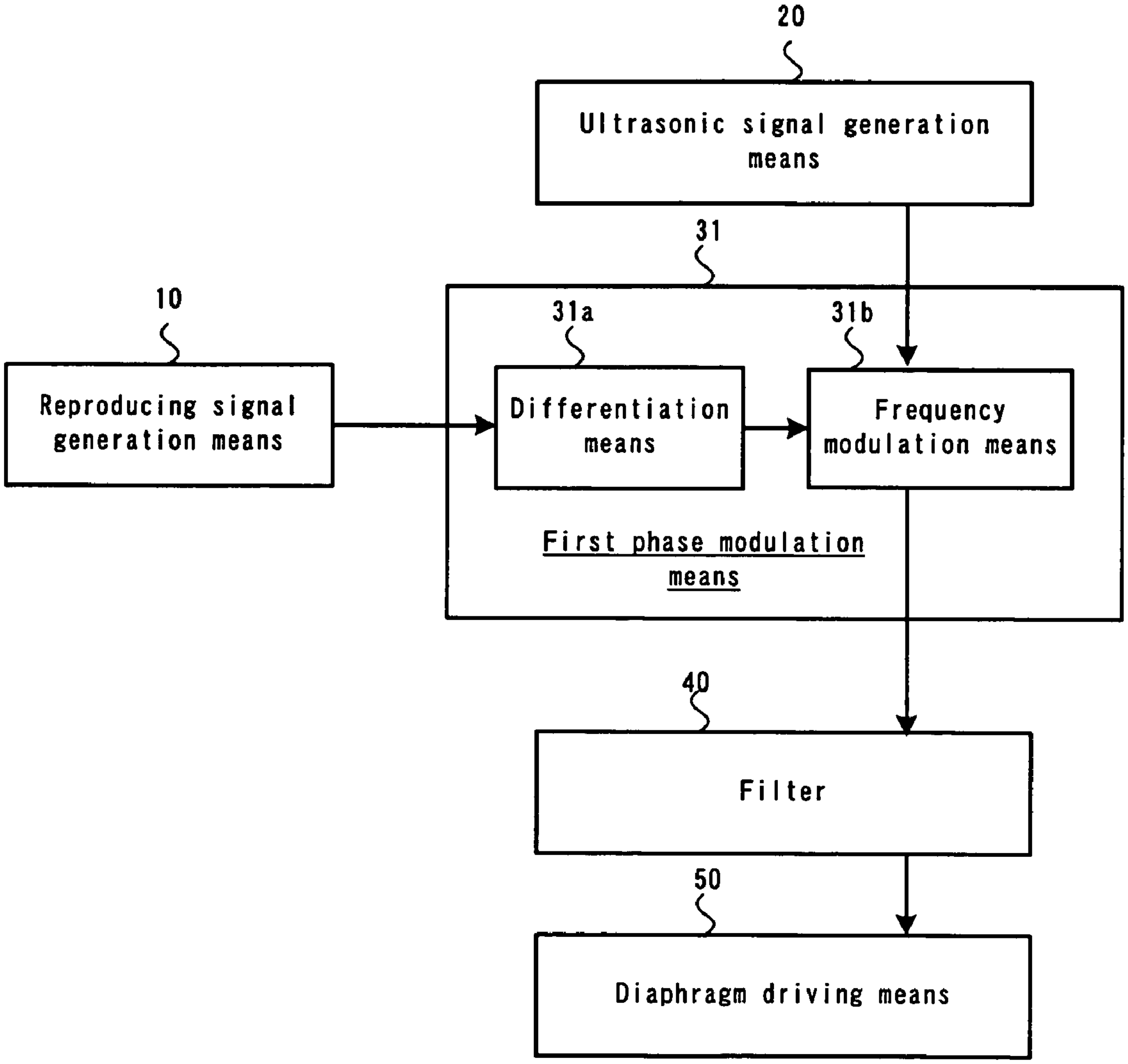
FIG. 5 is a diagram showing a first mode according to the present invention in which a carrier wave signal is phase modulated with a reproducing audible signal.

Referring to FIG. 5, a directional speaker in the first mode comprises reproducing signal generation means 10 that outputs a reproducing audible sound; ultrasonic signal generation means 20 that outputs a carrier wave signal at a frequency in the ultrasonic band; first phase modulation means 31 for phase modulating the carrier wave signal with the reproducing audible signal to produce a modulated carrier wave signal; and diaphragm vibration means 50 for vibrating the diaphragm based on the compression cycle of the modulated carrier wave signal. A filter 40 is provided between the first phase modulation means 31 and the diaphragm driving means 50. The filter 40 extracts a predetermined frequency band from the phase modulated carrier wave signal to increase the sound quality.

The first phase modulation means 31 phase modulates the carrier wave signal at a frequency in the ultrasonic band, output by the ultrasonic signal generation means 20, with the reproducing audible signal, output by the reproducing signal generation means 10, and vibrates the diaphragm to generate a sound wave based on the compression cycle of the modulated carrier wave signal obtained through the phase modulation. This phase modulation causes the directional speaker to produce a sound pressure distribution similar to that of the reproducing audible signal.

FIG. 6 is a diagram showing the signals and the sound pressure distribution in the mode in which the carrier wave signal is phase modulated with the reproducing audible signal.

FIG. 6A shows the sound pressure distribution of the target reproducing audible signal to be output. A listener recognizes the sound pressure distribution, composed of a repetition of a high sound pressure part a (solid arrow) and a low sound pressure part b (broken line arrow), as a sound that is a reproducing audible sound. FIG. 6B shows the audio signal of the reproducing audible sound. In the figure, the audio signal is represented by a sine wave signal at a predetermined frequency.

Phase modulating the ultrasonic carrier wave shown in FIG. 6(C) with the audio signal in FIG. 6B gives the phase modulated wave shown in FIG. 6D. The audible sound with the sound pressure distribution shown in FIG. 6E is obtained by driving the diaphragm with this phase modulated wave.

Comparison between the sound pressure distribution of the reproducing audible sound shown in FIG. 6A with the sound pressure distribution obtained though the phase modulation shown in FIG. 6E indicates that both sound pressure distributions match. A listener who hears this phase modulated audible sound can recognize a high quality sound because the sound pressure distribution is similar to that of the reproducing audible sound.

Let s(t) be a modulated output signal, fc be a carrier wave frequency, θ(t) be an instantaneous phase angle, fi(t) be an instantaneous frequency, and m(t) be an audio signal. Then, the instantaneous phase angle $\theta_P(t)$ of phase modulation and the instantaneous frequency $f_F(t)$ of frequency modulation are generally defined as follows.

$$s(t)=Ac\cdot\cos[\theta(t)]=Ac\cdot\cos[2\pi\int f(t)dt]$$

$$\text{Phase modulation PM:}\theta_P(t)=2\pi fct+kpm(t)\ [kp\text{:rad/V}]$$

$$\text{Frequency modulation FM:}f_F(t)=fc+kfm(t)\ [kf\text{:Hz/V}]$$

At this time, the instantaneous frequency $f_P(t)$ of the phase modulated output signal s(t) is represented as follows:

$$\begin{aligned}\text{Phase modulation } PM\text{: } f_p(t) &= (1/2\pi)\cdot(d\theta_p(t)/dt)\\ &= fc + (1/2\pi)\cdot kpdmt(t)/dt\end{aligned}$$

If kf=kp/2π, then $$f_P(t)=fc+kfdm(t)/dt$$

Thus, the modulated output signals(t), phase-modulated with the audio signal m(t), is equal to the signal generated by differentiating m(t) and then frequency modulating the differentiation result.

Conversely, the instantaneous phase angle $\theta_F(t)$ of the frequency modulated output signal s(t) is represented as follows:

$$\begin{aligned}\text{Frequency modulation } FM\text{: } \theta_F(t) &= 2\pi\int f_F(t)dt\\ &= 2\pi fct + 2\pi kft\int m(t)dt\end{aligned}$$

If kf=kp/2π as described above, then $$\theta_F(t)=2\pi fct+kp\int m(t)dt$$

Thus, the modulated output signal s(t), frequency-modulated with the audio signal m(t), is equal to the signal generated by integrating m(t) and then phase modulating the integration result.

Therefore, the relation between phase modulation and frequency modulation is such that integrating m(t) and then phase modulating the integration result is equivalent to frequency modulation and such that differentiating m(t) and then frequency modulating the differentiation result is equivalent to phase modulation.

Based on this relation, the first phase modulation means 31 can comprise a differentiation circuit 31*a* for differentiating the reproducing audible signal and a frequency modulation circuit 31*b* for frequency modulating the carrier wave signal with the output signal from the differentiation circuit 31*a*.

FIG. 7 is a diagram showing the signals and the sound pressure distribution when a carrier wave signal is phase modulated with a reproducing audible signal using a differentiation circuit.

FIG. 7A shows the sound pressure distribution of a reproducing audible signal similar to that shown in FIG. 6A, and FIG. 7B shows the audio signal of the reproducing audible signal similar to that shown in FIG. 6B. In the figures, the audio signal is represented by a sine wave signal at a predetermined frequency.

Differentiating the reproducing audible signal in FIG. 7B produces the differentiation signal in FIG. 7C. Frequency modulating the ultrasonic carrier wave shown in FIG. 7D with the differentiation signal in FIG. 7C produces the phase-modulated wave shown in FIG. 7E. Driving the diaphragm with this phase-modulated wave gives an audible sound with the sound pressure distribution shown in FIG. 7F.

Comparison between the sound pressure distribution of the reproducing audible sound shown in FIG. 7A with the sound pressure distribution obtained though the phase modulation shown in FIG. 7F indicates that both sound pressure distributions match as in FIG. 6. A listener who hears this phase modulated audible sound can recognize a high quality sound because the sound pressure distribution is similar to that of the reproducing audible sound.

In this case, the carrier wave signal is a signal wave at a frequency of 40 kHz-100 kHz, and the first phase modulation means phase modulates the carrier wave signal using a modulation phase in the range of 0.1 rad to 25 rad. In addition to a sine wave, a rectangular wave can also be used for the carrier wave signal. The carrier wave signal that is a rectangular wave will be described later. The modulation frequency for modulating the carrier wave signal is about 0.1 kHz-30 kHz.

Next, the second mode will be described in which the carrier wave signal is modulated based on the slope of a reproducing audible signal. In the second mode, the carrier wave signal is phase modulated with a reproducing audible signal. The following describes the configuration of the second mode with reference to FIG. 8.

Figure 8:
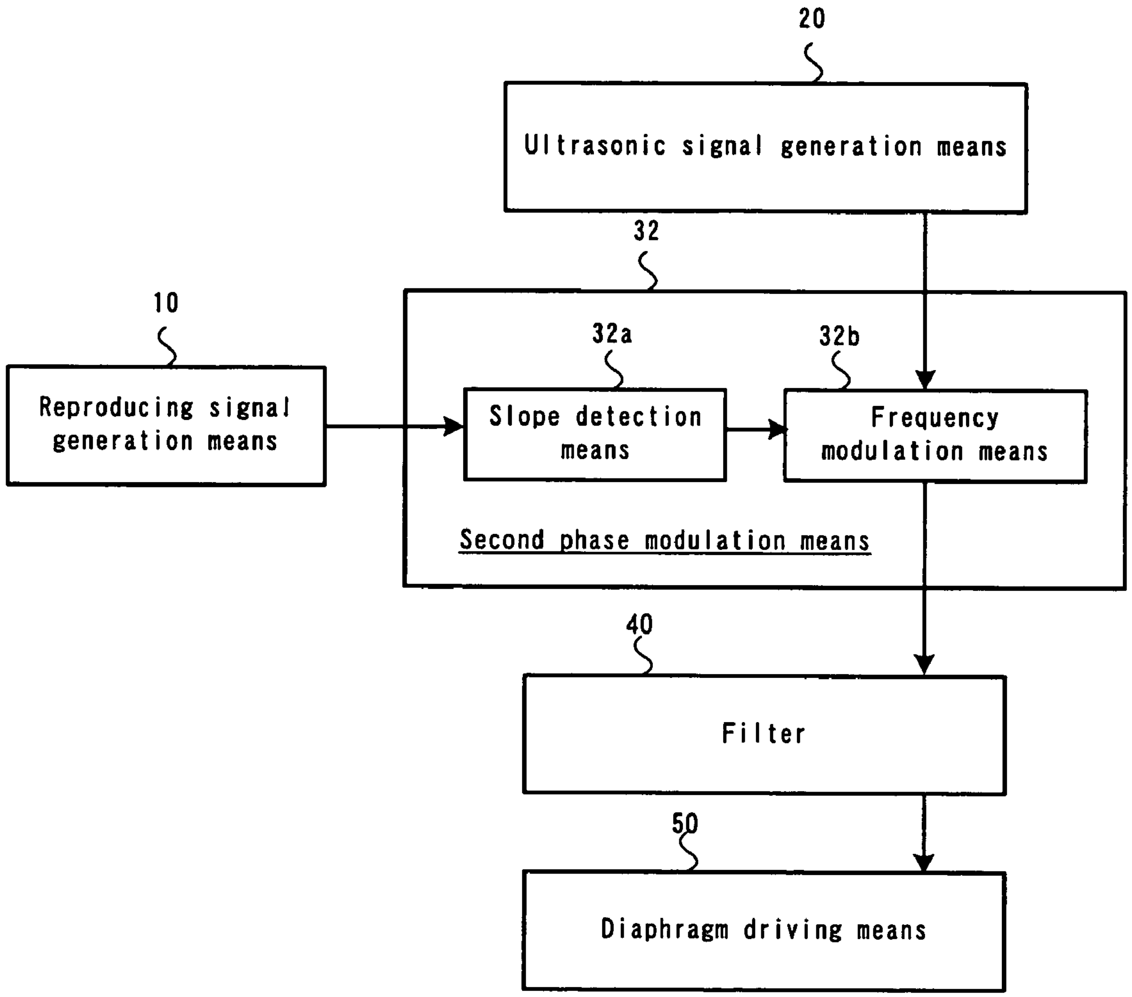
FIG. 8 is a diagram showing a second mode according to the present invention in which a carrier wave signal is phase modulated with a reproducing audible signal.

Referring to FIG. 8, a directional speaker in the second mode comprises reproducing signal generation means 10 for outputting a reproducing audible signal; ultrasonic signal generation means 20 for outputting a carrier wave signal at a frequency in the ultrasonic band; second phase modulation means 32 for phase modulating the carrier wave signal with the reproducing audible signal to produce a modulated carrier wave signal; and diaphragm vibration means 50 for vibrating the diaphragm based on the compression cycle of the modulated carrier wave signal. A filter 40 is provided between the second phase modulation means 32 and the diaphragm driving means 50. The filter 40 extracts a predetermined frequency band from the phase modulated carrier wave signal to increase the sound quality.

The second phase modulation means 32 is means for modulating the carrier wave signal according to the slope of the reproducing audible signal. In the carrier wave signal modulation according to the slope, the carrier wave signal is modulated at a high density in the rising signal part, and at a low density in the falling signal part.

The mode, in which the carrier wave signal is modulated at a high or low density according to the signal rising or falling part, is carried out in one of the following two ways. In one way, the carrier wave signal is modulated at a high density according to the signal width of the rising part of the reproducing audible signal, and at a low density according to the signal width of the falling part of the reproducing audible signal. In the other way, the carrier wave signal is modulated at a high density according to the rising rate of the rising part of the reproducing audible signal, and at a low density according to the falling rate of the falling part of the reproducing audible signal.

In the former way, the compression (high density/low density) modulation of the carrier wave signal is carried out according to the signal width. With the relation between the signal width and the modulation level established in advance, the carrier wave signal is modulated at a high density using a modulation level corresponding to the signal width of the rising part of the reproducing audible signal, and at a low density using a modulation level corresponding to the signal width of the falling part of the reproducing audible signal. In the latter way, with the relation between the duty ratio of the signal width of the rising/falling part of the reproducing audible signal and the modulation level established in advance, the carrier wave signal of the rising part of the reproducing audible signal is modulated at a high density, and the carrier wave signal of the falling part of the reproducing audible signal at a low density, using a modulation level corresponding to the duty ratio.

FIG. 9 is a diagram showing the signals and the sound pressure distribution in the mode in which a carrier wave signal is modulated with a reproducing audible signal based on the slope of the reproducing audible signal.

Figures 9A, 9B, 9C, 9D, 9E, 9F:
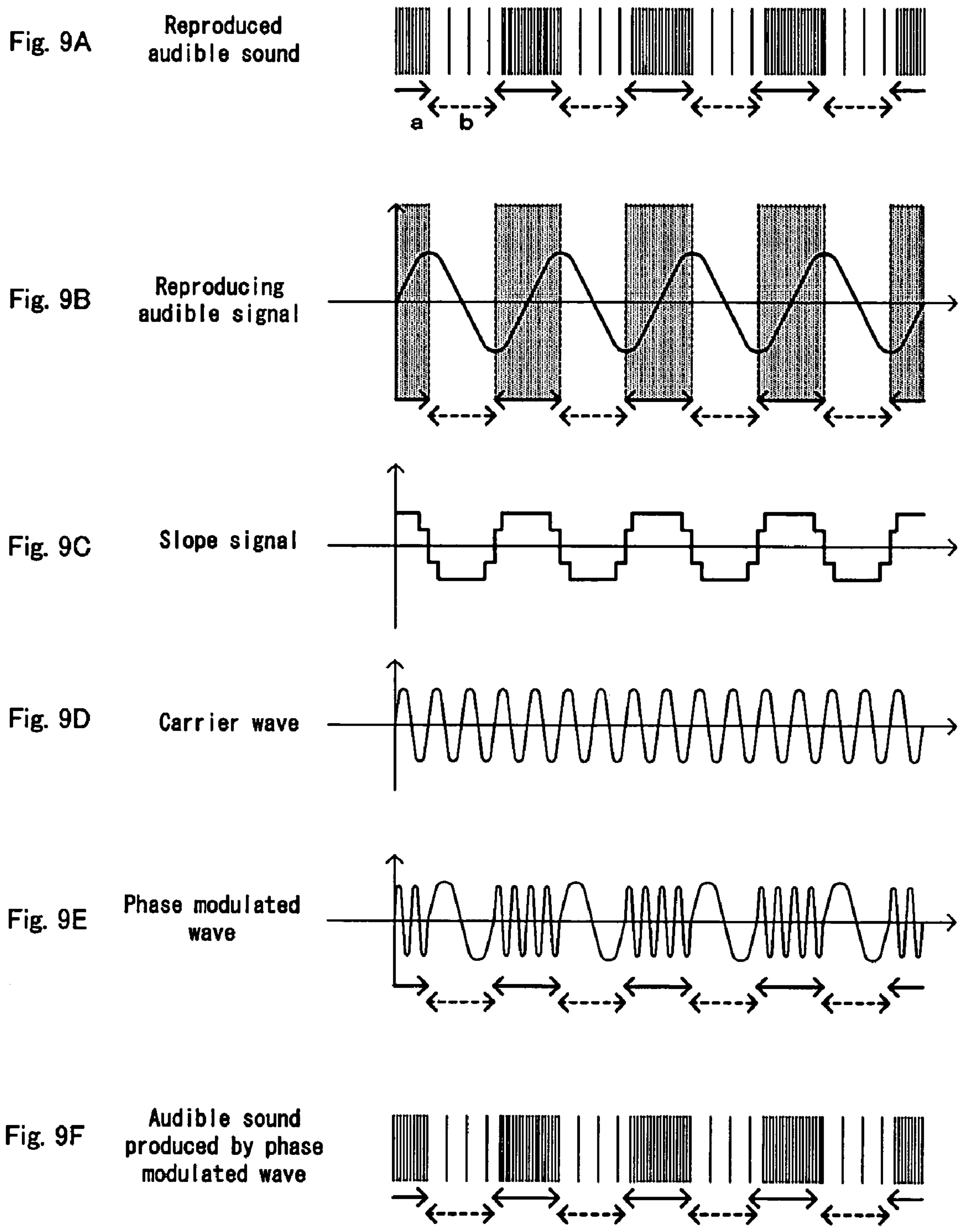
FIGS. 9A-9F are diagrams showing the signals and the sound pressure distribution in a mode according to the present invention in which a carrier wave signal is modulated with a reproducing audible signal based on the slope of the reproducing audible signal.

FIG. 9A shows the sound pressure distribution of the reproducing audible sound similar to that shown in FIG. 7A. FIG. 9B shows the audio signal of the reproducing audible sound similar to that shown in FIG. 7B. In the figure, the audio signal is represented by a sine wave signal at a predetermined frequency.

Finding the slope of the reproducing audible signal in FIG. 9B gives the slope signal in FIG. 9C. This slope signal is an example in which the signal is determined in increments where any number of increments may be set. The slope may also be determined continuously. When the slop is determined continuously, the result is the differentiation signal shown in FIG. 7.

Modulating the ultrasonic carrier wave signal shown in FIG. 9D with the slope signal shown in FIG. 9C produces the modulated wave shown in FIG. 9E. Driving the diaphragm with this modulated wave produces an audible sound with the sound pressure distribution shown in FIG. 9F.

Comparison between the sound pressure distribution of the reproducing audible sound shown in FIG. 9A with the sound pressure distribution obtained though the phase modulation shown in FIG. 9F indicates that both sound pressure distributions match as in FIG. 7. A listener who hears this phase modulated audible sound can recognize a high quality sound because the sound pressure distribution is similar to that of the reproducing audible sound.

It is also possible to modulate the carrier wave signal only for the rising signal part of the reproducing audible signal. Because a listener usually recognizes an audio in the high sound pressure part of the sound pressure distribution but not so much in the low sound pressure part, it would be enough to modulate the carrier wave signal only for the rising signal part of the reproducing audible signal from which a high sound pressure is generated. This reduces the power consumption.

The modulation of the carrier wave signal only for the rising signal part of the reproducing audible signal can be carried out by frequency modulation means 32*b* in the second phase modulation means 32.

FIG. 10 is a diagram showing the signals and the sound pressure distribution in the mode in which a carrier wave signal is modulated only for the rising signal part of a reproducing audible signal.

Figures 10A, 10B, 10C, 10D, 10E, 10F:
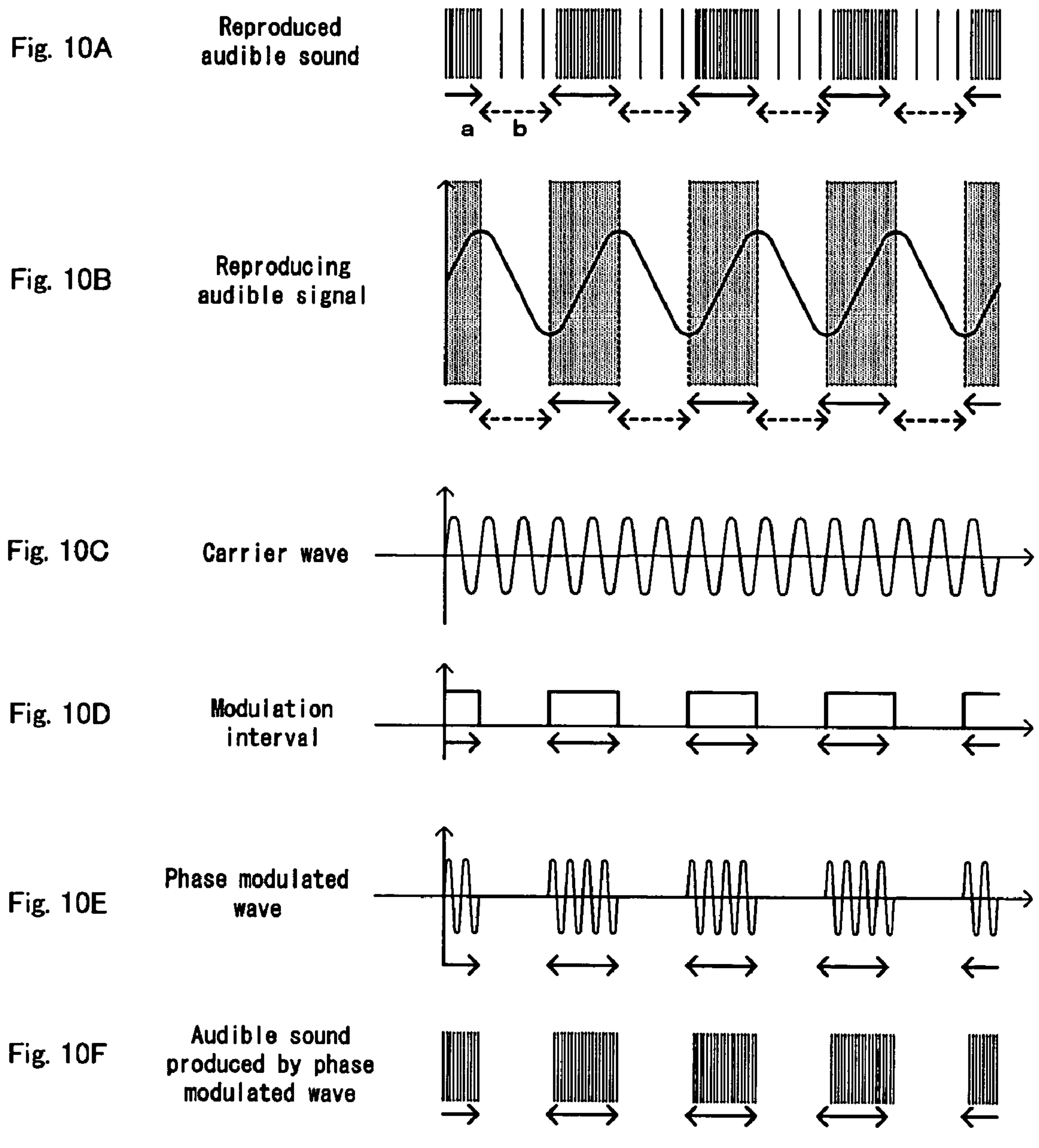
FIGS. 10A-10F are diagrams showing the signals and the sound pressure distribution in a mode according to the present invention in which a carrier wave signal is modulated only for the rising signal part of a reproducing audible signal.

FIG. 10A shows the sound pressure distribution of the reproducing audible sound similar to that shown in FIG. 9A. FIG. 10B shows the audio signal of the reproducing audible sound similar to that shown in FIG. 9B. In the figure, the audio signal is represented by a sine wave signal at a predetermined frequency.

Finding the rising signal part of the reproducing audible sound in FIG. 10B gives the modulation intervals in FIG. 10D. Modulating the ultrasonic carrier wave shown in FIG. 10C with the modulation intervals in FIG. 10D produces the modulated wave shown in FIG. 10E. Driving the diaphragm with this modulated wave produces an audible sound with the sound pressure distribution shown in FIG. 10F. The modulation level can be set according to the width of the modulation interval.

Comparison between the sound pressure distribution of the reproducing audible sound shown in FIG. 10A with the sound pressure distribution obtained though the phase modulation shown in FIG. 10F indicates that both sound pressure distributions match as in FIG. 9. A listener who hears this phase modulated audible sound can recognize a high quality sound because the sound pressure distribution is similar to that of the reproducing audible sound.

Although the amplitude of the reproducing audible sound is constant in the examples shown in FIGS. 6, 7, 9, and 10, the carrier wave signal can be modulated in the same way even if the amplitude of the reproducing audible sound varies. FIG. 11 is a diagram showing the signals and the sound pressure distribution in the mode in which the amplitude of the reproducing audible sound varies.

FIG. 11A shows the sound pressure distribution of the reproducing audible sound similar to that shown in FIG. 7A, and FIG. 11B shows the audio signal of the reproducing audible sound similar to that shown in FIG. 7B. In the figure, the audio signal is represented by a sine wave signal at a predetermined frequency.

Phase modulating the ultrasonic carrier wave shown in FIG. 11C with the audio signal in FIG. 11B produces the phase modulated wave shown in FIG. 11D. The amplitude of the phase modulated wave is modulated according to the amplitude of the reproducing audible sound. Driving the diaphragm with this phase modulated wave gives an audible sound with the sound pressure distribution shown in FIG. 11E.

Comparison between the sound pressure distribution of the reproducing audible sound shown in FIG. 11A with the sound pressure distribution obtained though the phase modulation shown in FIG. 11E indicates that both sound pressure distributions match. A listener who hears this phase modulated audible sound can recognize a high quality sound because the sound pressure distribution is similar to that of the reproducing audible sound.

Figures 12A, 12B, 12C, 12D:
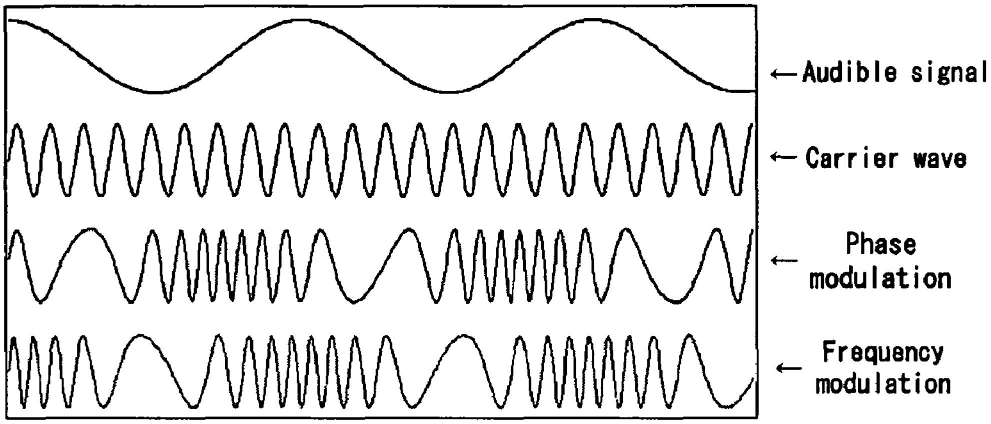
FIGS. 12A-12D are diagrams showing experimental data on the waveforms of the original sound wave of an audible sound, a carrier wave, a phase modulated wave according to the present invention, and the conventional frequency modulated wave.

FIG. 12 is a diagram showing experimental data on the waveforms of the original sound wave of an audible sound, the carrier wave, the phase modulated wave according to the present invention, and the conventional frequency modulated wave. FIG. 12A shows the waveform of an audible sound, FIG. 12B shows the waveform of the carrier wave, FIG. 12C shows waveform of the phase modulated waveform according to the present invention, and FIG. 12D shows the waveform of the conventional frequency modulated wave, respectively.

In the phase modulated waveform shown in FIG. 12C, the carrier wave is compressed in the rising slope (rising part), and expanded in the falling slope (falling part), of the audible signal. In the frequency modulated waveform in FIG. 12D, the carrier wave is compressed in the peak part, and expanded in the trough part, of the audible signal.

On the other hand, when an audible signal is output directly from the speaker, the speaker cone moves forward in the rising slope part of the signal to compress air, and moves back in the falling slope part of the signal to expand air, to produce a compression wave.

Therefore, phase modulating the carrier wave produces the same compression wave as the compression wave in air actually produced by the speaker.

Figure 13:
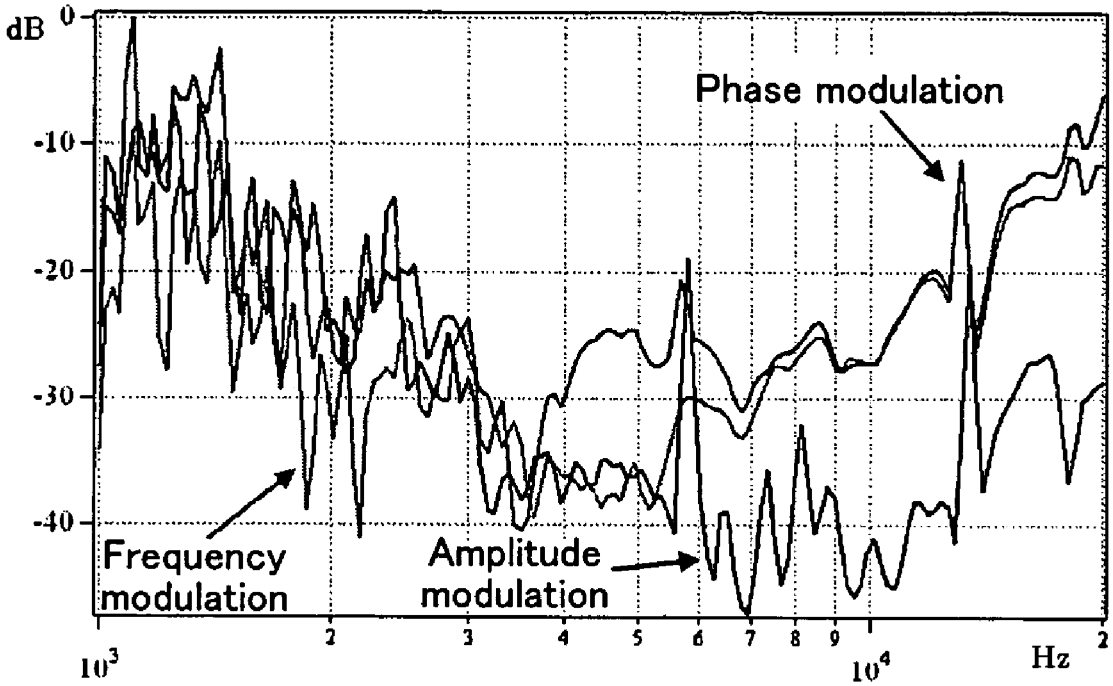
FIG. 13 is a diagram showing the sound pressure frequency characteristics for comparing the conventional amplitude modulation and frequency modulation with the modulation according to the present invention.

FIG. 13 is a diagram showing the sound pressure frequency characteristics for comparing the results obtained through the conventional amplitude modulation, conventional frequency modulation, and modulation according to the present invention.

FIG. 13 shows the measurement results of sound pressure frequency characteristics when the conventional amplitude modulation, conventional frequency modulation, and modulation according to the present invention are used for the same audible signal and then the modulated signal is output from the speaker. Comparison among the conventional amplitude modulation, conventional frequency modulation, and modulation according to the present invention indicates that the sound pressure of the modulation according to the present invention is generally high across a wide frequency range.

Next, the carrier wave used for a directional speaker will be described with reference to FIGS. 14-18.

Although a sine wave is usually used for the ultrasonic carrier wave, a rectangular ultrasonic signal can be used for the directional speaker according to the present invention with its duty ratio set in a predetermined range. This reduces the distortion of an audible signal.

Figure 14A:
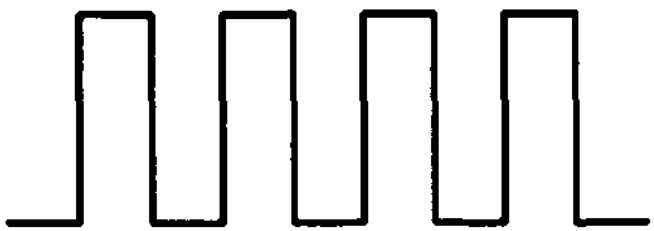
FIGS. 14A-14C are diagrams showing an example of rectangular waves used as a carrier wave in the method according to present invention.
Figure 14B:
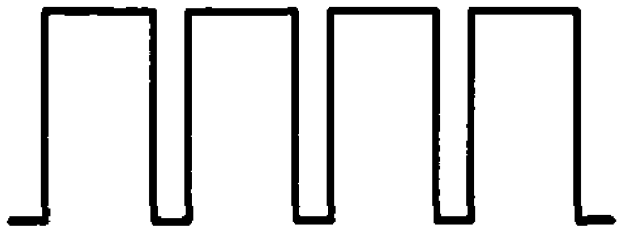
Figure 14C:
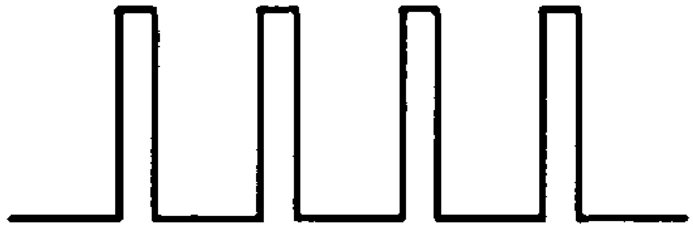

FIG. 14 shows an example of a rectangular wave used as the carrier wave. FIG. 14A shows a rectangular wave with the duty ratio of 1:1, FIG. 14B shows a rectangular wave with a duty ratio where the high period is long, and FIG. 14C shows a rectangular wave with a duty ratio where the low period is long.

FIG. 15 is a diagram showing the signals and the sound pressure distributions of a rectangular wave with the duty ratio of 1:1.

FIG. 15A shows the sound pressure distribution of a reproducing audible sound, and FIG. 15B shows the audio signal of the reproducing audible sound. In the figure, the audio signal is represented by a sine wave signal at a predetermined frequency.

Phase modulating the ultrasonic rectangular carrier wave shown in FIG. 15C with the audio signal in FIG. 15B produces the phase modulated wave shown in FIG. 15D. Driving the diaphragm with this phase modulated wave gives an audible sound with the sound pressure distribution shown in FIG. 15E.

Comparison between the sound pressure distribution of the reproducing audible sound shown in FIG. 15A with the sound pressure distribution obtained though the phase modulation shown in FIG. 15E indicates that both sound pressure distributions match.

FIG. 16 is a diagram showing the signals and the sound pressure distributions of a rectangular wave with a duty ratio where the high period is long.

Figure 16A:
FIGS. 16A-16E are diagrams showing the signals and the sound pressure distribution when the rectangular wave has a duty ratio where the high period is long.
Figure 16B:
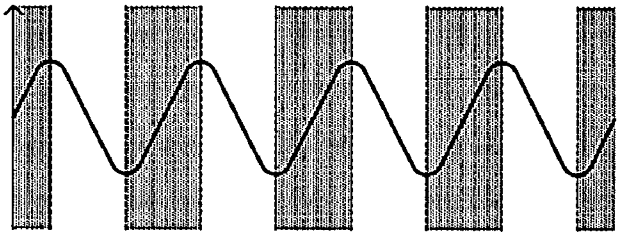

FIG. 16A shows the sound pressure distribution of a reproducing audible sound, and FIG. 16B shows the audio signal of the reproducing audible sound. In the figure, the audio signal is represented by a sine wave signal at a predetermined frequency.

Figure 16C:
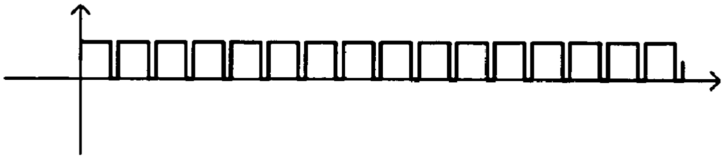
Figure 16D:
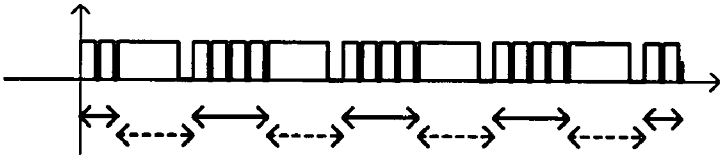

Phase modulating the ultrasonic rectangular carrier wave shown in FIG. 16C with the audio signal in FIG. 16B produces the phase modulated wave shown in FIG. 16D. Driving the diaphragm with this phase modulated wave gives an audible sound with the sound pressure distribution shown in FIG. 16E.

Figure 16E:

Comparison between the sound pressure distribution of the reproducing audible sound shown in FIG. 16A with the sound pressure distribution obtained though the phase modulation shown in FIG. 16E indicates that both sound pressure distributions match.

FIG. 17 is a diagram showing the signals and the sound pressure distributions of a rectangular wave with a duty ratio where the low period is long.

Figures 17A, 17B, 17C, 17D, 17E:
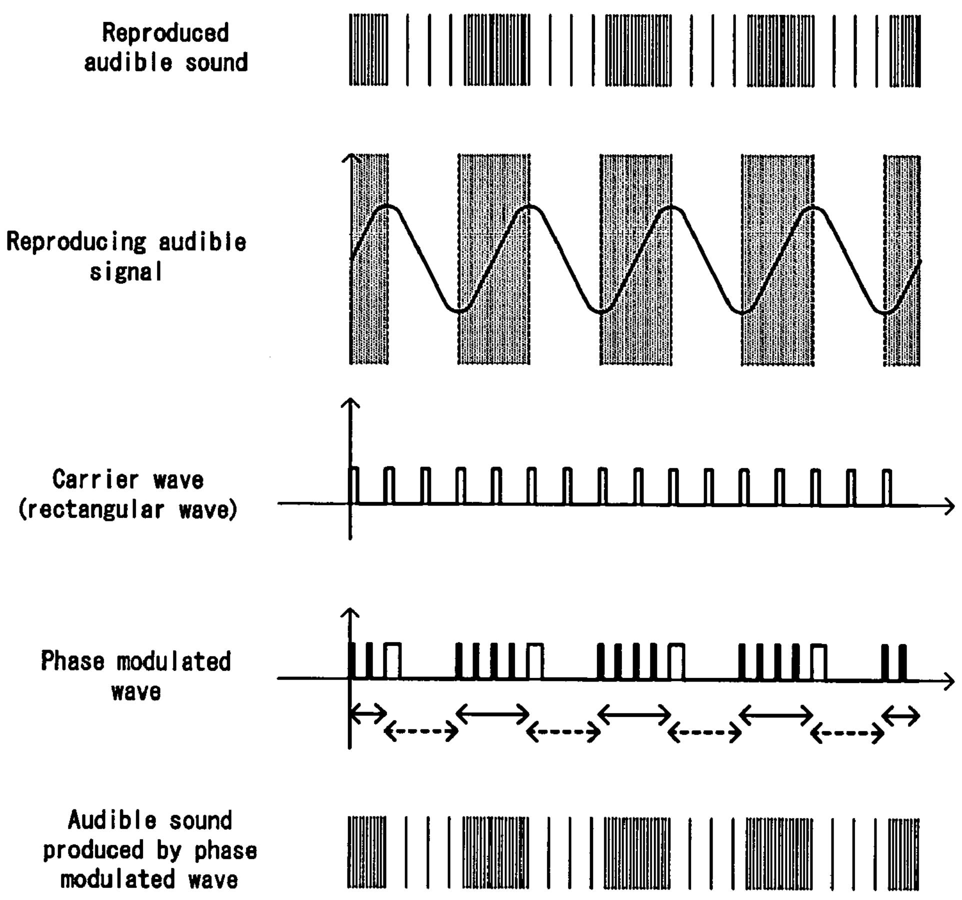
FIGS. 17A-17E are diagrams showing the signals and the sound pressure distribution when the rectangular wave has a duty ratio where the low period is long.

FIG. 17A shows the sound pressure distribution of a reproducing audible sound, and FIG. 17B shows the audio signal of the reproducing audible sound. In the figure, the audio signal is represented by a sine wave signal at a predetermined frequency.

Phase modulating the ultrasonic rectangular carrier wave shown in FIG. 17C with the audio signal in FIG. 17B produces the phase modulated wave shown in FIG. 17D. Driving the diaphragm with this phase modulated wave gives an audible sound with the sound pressure distribution shown in FIG. 17E.

Comparison between the sound pressure distribution of the reproducing audible sound shown in FIG. 17A with the sound pressure distribution obtained though the phase modulation shown in FIG. 17E indicates that both sound pressure distributions match.

Figure 18A:
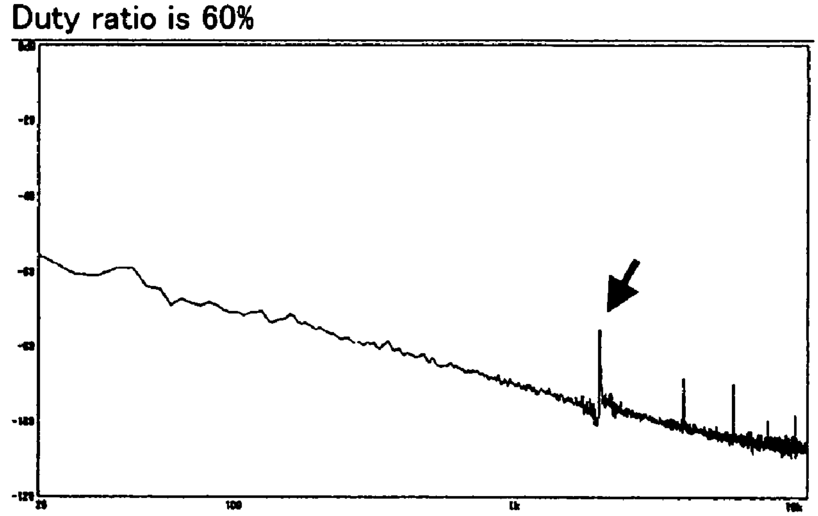
FIGS. 18A-18C are diagrams showing experimental data on the sound pressure characteristics for the frequency when the duty ratio of the carrier wave is changed.
Figure 18B:
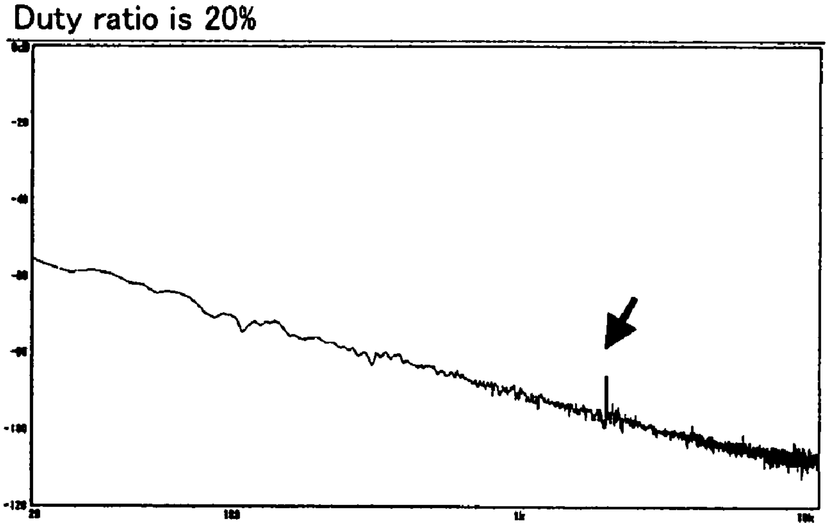
Figure 18C:
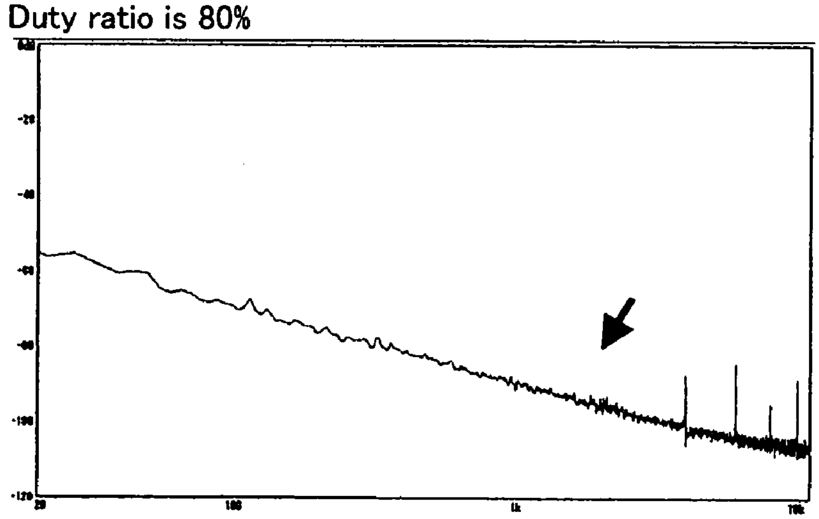

FIG. 18 shows experimental data on the sound pressure characteristics for the frequency when the duty ratio of a carrier wave is changed. FIG. 18A shows a case in which the duty ratio is 60%, FIG. 18B shows a case in which the duty ratio is 20%, and FIG. 18C shows a case in which the duty ratio is 80%. In the description below, phase modulation is carried out assuming that the frequency of the carrier wave is 37.93 kHz and that an audible sound for modulation has a frequency of 2 kHz and amplitude of 1.5V p-p (top to bottom voltage) and then the output from the speaker is captured by a microphone for FFT analysis.

When the duty ratio shown in FIG. 18A is 60%, the sound pressure of a 2 kHz sound, which an audible sound, is high (arrow in FIG. 18A) and the sound is less affected by high frequency components. Therefore, the audible sound can be reproduced clearly. Although not shown in the figure, almost the same characteristics can be obtained when the duty ratio is 70%-30%.

When the duty ratio shown in FIG. 18B is 20%, no high frequency components are found. However, because the sound pressure of a 2 kHz sound, which is an audible sound, is low (arrow in FIG. 18B), the sound is not practical.

When the duty ratio shown in FIG. 18C is 80%, high-frequency components increase and the sound pressure of a 2 kHz sound, which is an audible sound, is not observed (arrow in FIG. 18C). Therefore, a sound different from a desired sound is output.

For a rectangular wave with a duty ratio where the high or low period is long such as those shown in FIG. 14B and FIG. 14C, a vibration continuity problem occurs if the duty ratio is extremely high or low and the directional speaker enters the temporary stop state. As a result, the distortion included in the reproduced audible sound becomes large and the sound quality is degraded. Note that the duty ratio is represented by a ratio of the positive side period to the whole cycle, that is, duty ratio=(length of high period)/(length of high period+length of low period) in percent (%).

As described above, it is understood that the duty ratio of this rectangular wave must be set to a ratio that makes the sound pressure in the wavelength area of the reproducing audible signal higher than the sound pressure of the high-frequency components.

Therefore, from the sound quality viewpoint, an audible sound free of distortion can be output by setting the duty ratio of the rectangular carrier wave in a range from 20% to 80%. A duty ratio of around 60% is preferable.

If a distortion, if slight, is included in a sine wave when the sign wave is used as the carrier wave, a sound other than a desired audible sound is created in the audible sound and a noise is generated. In general, creating a sine wave free of distortion is difficult, requires a complicated circuit configuration, and increases the circuit size.

By contrast, the configuration according to the present invention, in which a rectangular wave is used as the carrier wave, makes it easy to create a rectangular wave free of distortion, makes the circuit compact, and reduces the device size.

Next, the directional speaker according to the present invention can improve the sound quality by adjusting the frequency characteristics of the modulated carrier wave signal obtained through modulation. The filter, which passes the predetermined frequency components of the modulated carrier wave signal, is provided between the modulation means and the diaphragm driving means as means for adjusting the frequency characteristics of the modulated carrier wave signal. This can be configured, for example, by the filter 40 in FIG. 1 described above.

FIG. 19 schematically shows the sound pressure characteristics for the frequency of the diaphragm driving means. A piezoelectric element, which is the vibration source of the ultrasonic speaker, has the characteristics where a center frequency is the resonance point.

Figure 19A:
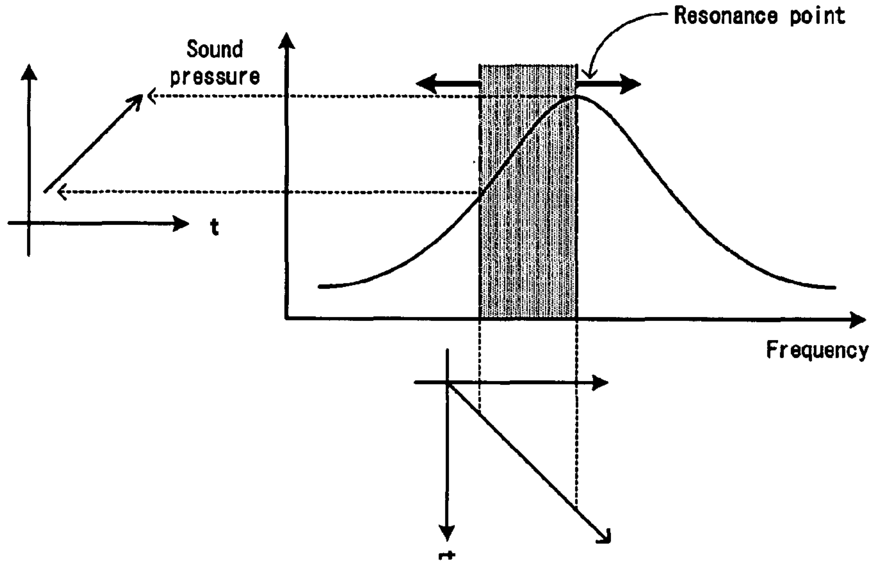
FIGS. 19A-19B are diagrams schematically showing the sound pressure characteristics for the frequency of diaphragm driving means.
Figure 19B:
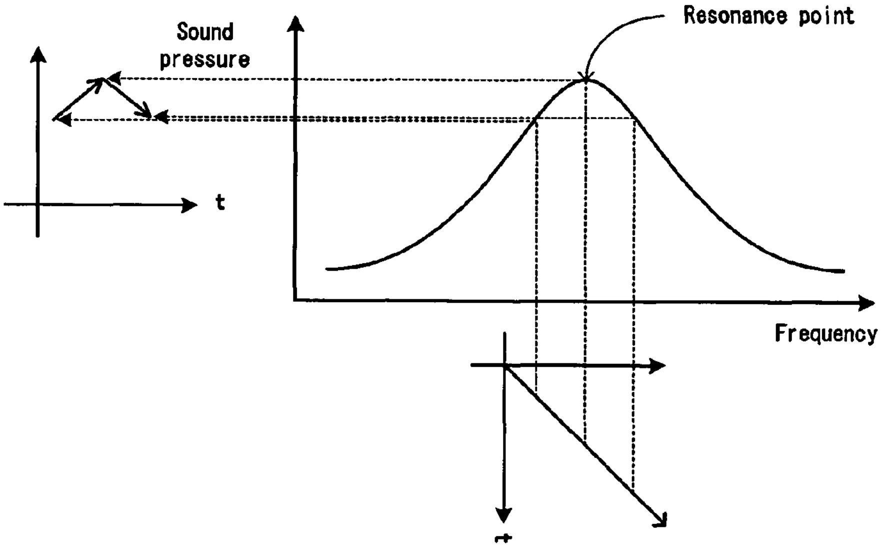

Referring to FIG. 19B, the frequency sound pressure characteristics of the diaphragm vibration means has a resonance point and a high sound pressure is output at the frequency of this resonance point. If modulation is carried out in the frequency band across the resonance point for the diaphragm driving means having the frequency sound pressure characteristics described above, the sound pressure characteristics are not linear as shown in FIG. 19B. Therefore, the output sound pressure becomes distorted, a noise is generated, and the sound quality is degraded.

To solve this problem, the low pass filter is used to remove the frequency band higher than the resonance point for reducing the noise caused by the distortion. A high pass filter is also used to remove a low frequency band that a listener cannot hear even if it is reproduced. This enables only the effective signal to be input to the ultrasonic speaker, generating and reproducing an audio signal free of distortion.

The frequency band shown in FIG. 19A can be created by combining the low pass filter with the high pass filter. Because relation between the frequency and the sound pressure is linear, the generation of a distortion can be suppressed even if the frequency is changed in this frequency band.

Figure 20:
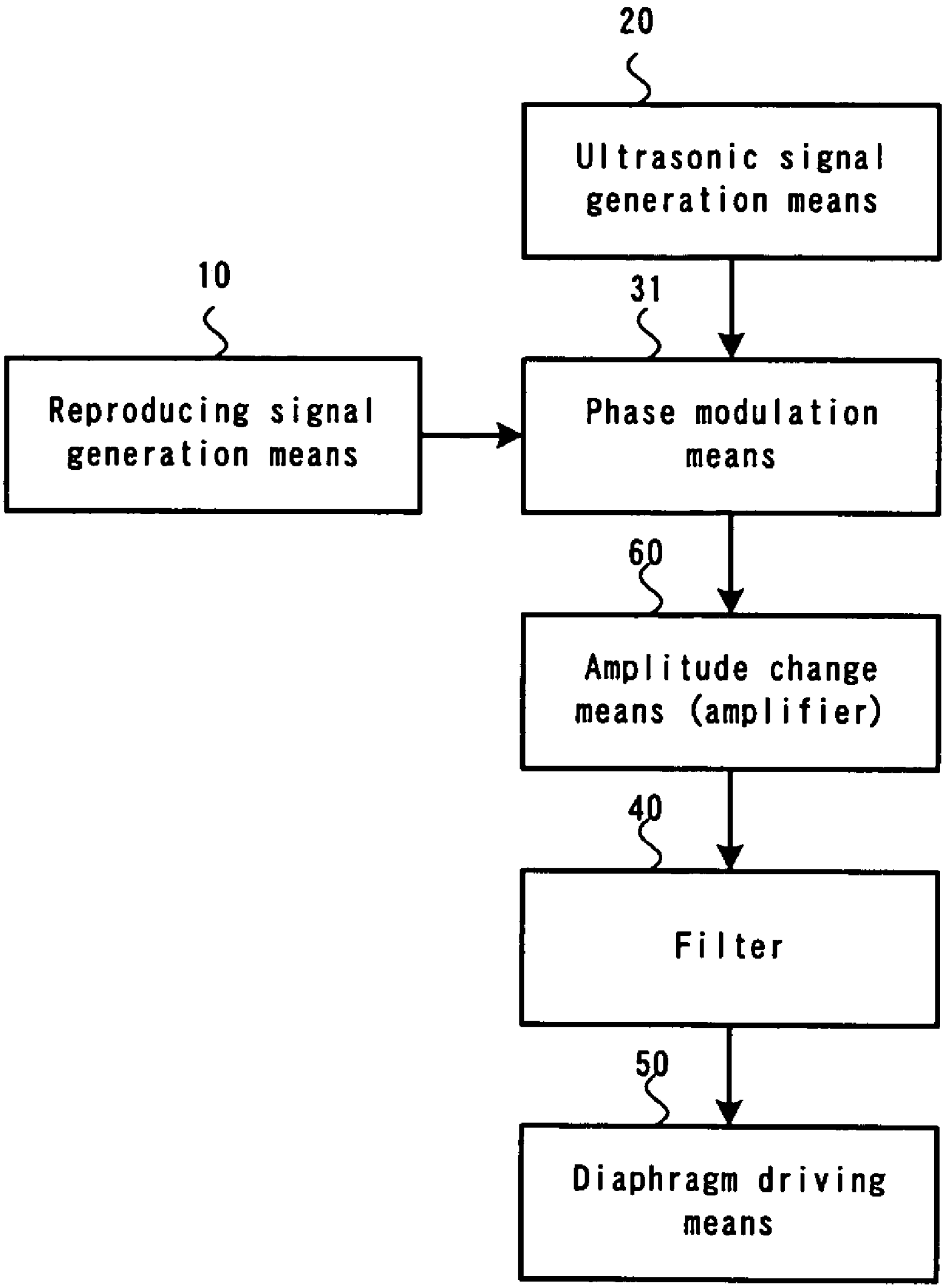
FIG. 20 is a diagram showing one configuration of amplitude change means.

In addition, amplitude change means is provided between the modulation means and the diaphragm driving means as means for adjusting the frequency characteristics of the modulated carrier wave signal. FIG. 20 shows an example of the configuration of the amplitude change means provided between the first phase modulation means 31 and the diaphragm driving means 50 or the filter 40.

Amplitude change means 60 has amplitude characteristics for the frequency and, based on the amplitude characteristics, changes the sound pressure characteristics for the frequency of the diaphragm driving means 50 to predetermined sound pressure characteristics.

FIG. 21 is a diagram showing how the sound pressure characteristics are changed. FIG. 21A shows the frequency characteristics of a reproducing audible sound. Although the characteristics show that the signal strength is constant for the frequencies, any frequency characteristics may be used.

Figure 21A:
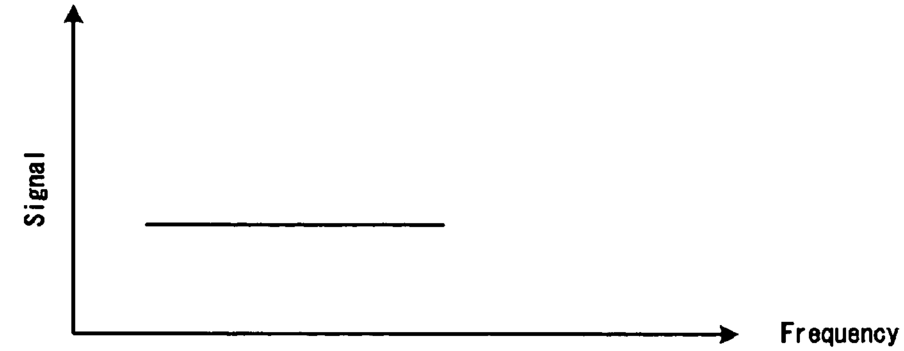
FIGS. 21A-21D are diagrams showing a change in the sound pressure characteristics.
Figure 21B:
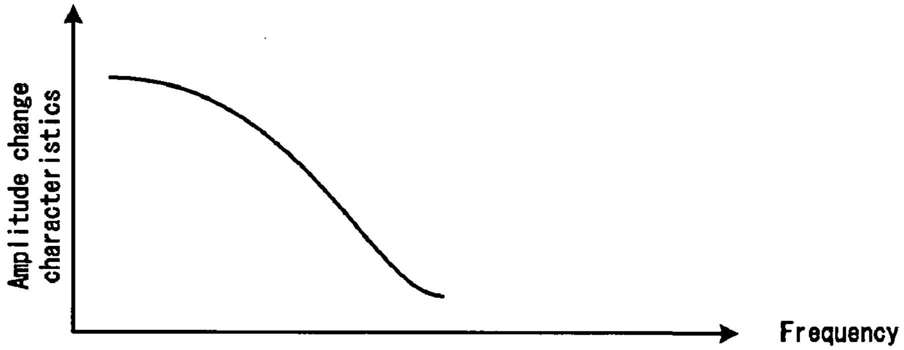
Figure 21C:
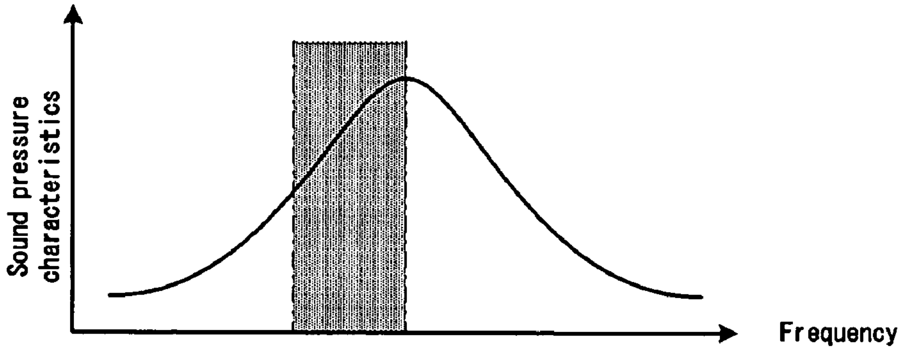
Figure 21D:
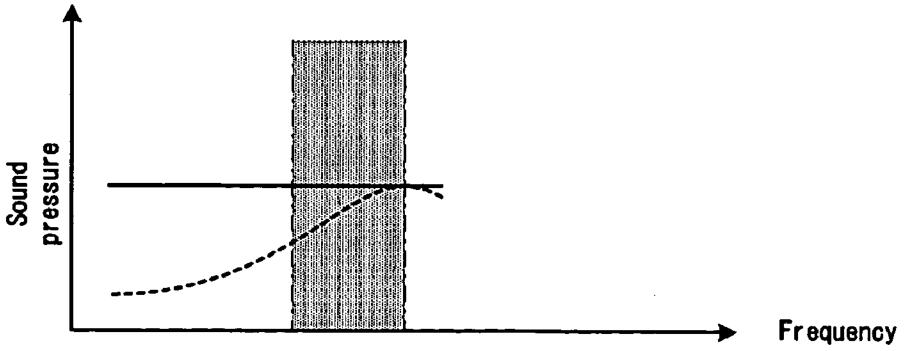

On the other hand, FIG. 21C shows the frequency characteristics of the diaphragm driving means as described above. The frequency characteristics of the diaphragm driving means are that the sound pressure increases as the frequency increases in the frequency band set up by the filter described above. When the reproducing audible sound shown in FIG. 21A is reproduced by the diaphragm driving means with the characteristics shown in FIG. 21C, the sound pressure with the frequency characteristics indicated by the broken line in FIG. 21D is obtained and, as shown in the figure, the sound pressure is decreased as the frequency becomes lower.

To output the sound pressure with the same characteristics as those of the reproducing audible sound shown in FIG. 21A, the amplitude change means with the frequency characteristics shown in FIG. 21B is used to change the amplitude of the modulation signal. By using the frequency characteristics shown in FIG. 21B as the reverse characteristics of the frequency characteristics of the diaphragm driving means shown in FIG. 21C, the sound pressure with the same characteristics as those of the reproducing audible sound in FIG. 21A, such as the one indicated by the solid line in FIG. 21D, can be obtained.

Although the amplitude is changed so that the characteristics become the same as those of the reproducing audible sound, the amplitude can also be changed so that different characteristics are obtained. The amplitude may be changed to any amplitude by setting up the frequency characteristics of the amplitude change means.

Figure 23:
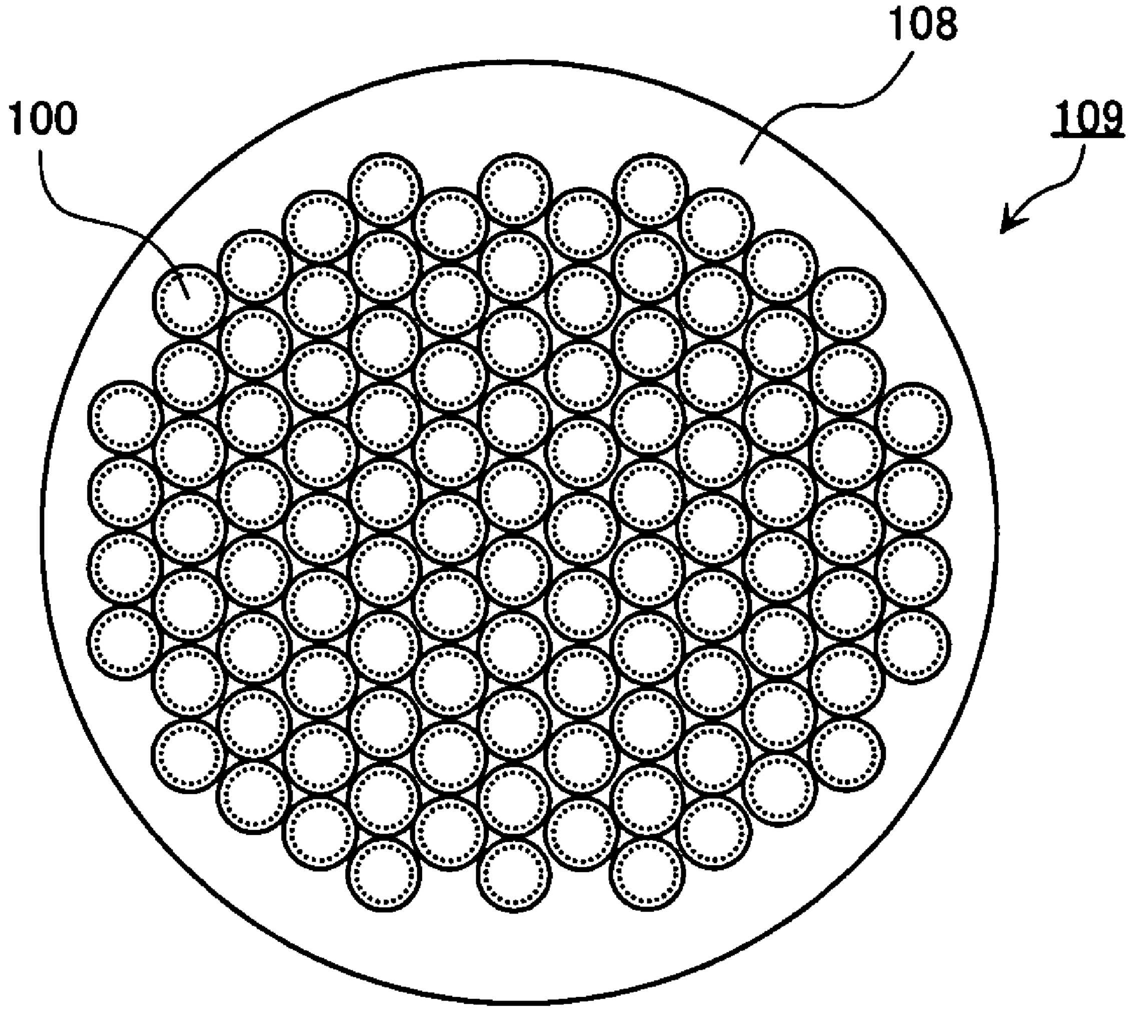
FIG. 23 is a top plan view showing the configuration of a directional speaker.

A typical directional speaker using the parametric effect, such as the one described in Description of the Prior Art, uses a method in which an ultrasonic carrier wave is amplitude modulated with an audible sound as described above. This amplitude modulation is a method of nonlinear theory in which the waveform of the amplitude modulated carrier wave is distorted while it propagates through air before an audible sound is generated. Therefore, only a small amount of audible sound is generated from the amplitude modulated carrier wave, meaning that the conversion efficiency is very low. This means that an attempt to produce a loud sound using this driving method creates a problem that requires many ultrasonic speakers as shown in FIG. 23, makes the device large, and increases the power consumption of the electric circuit.

By contrast, the directional speaker using the modulation method of the present invention generates a modulated ultrasonic carrier wave signal that allows a listener to directly hear the audible sound using the function of the ears that cannot hear the ultrasonic wave and, thus, improves the efficiency of conversion from the ultrasonic wave to the audible sound. Therefore, one or more ultrasonic speakers are enough to produce a sound loud enough for a listener to hear. This configuration makes the device compact in which this directional speaker is mounted. This configuration also reduces the number of ultrasonic speakers mounted in the device, reducing the power consumption.

Figure 22:
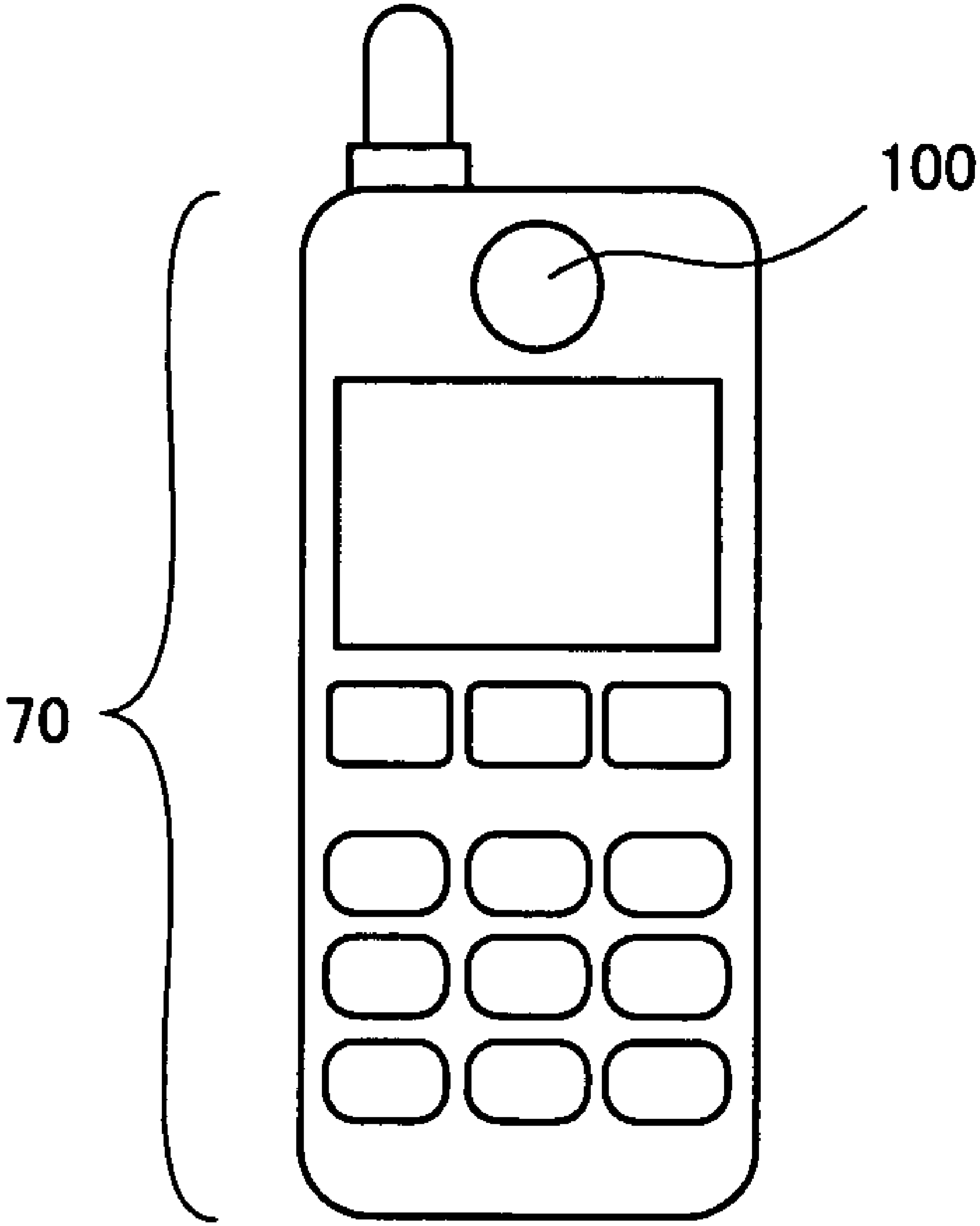
FIG. 22 is a schematic diagram showing an example of practical application of the ultrasonic speaker.

FIG. 22 is a schematic diagram showing an example of practical application of the ultrasonic speaker. As shown in the figure, the ultrasonic speaker 100 according to the present invention can be mounted as the speaker of a small portable electric apparatus 70. Although one ultrasonic speaker 100 is mounted in the example in the figure, a desired number of speakers can be mounted in any part of the portable electric apparatus 70 to increase the sound pressure that can be output.

According to the present invention, the directional speaker driving method is used as described above in which an ultrasonic carrier wave is phase modulated with an audible signal to be reproduced. This allows a speaker with a stronger directivity to be manufactured.

Mounting a compact, low-profile directional speaker, which achieves the effect described above, in an electronic device such as a cellular phone, a portable information terminal, a portable TV set, or a personal computer, makes the device so directional that only the listener but not others can hear the sound. The present invention is applicable to electronic devices such as a cellular phone, a portable information terminal, a portable TV set, and a personal computer.

What is claimed is:

1. A directional speaker that vibrates a diaphragm to send sound waves, comprising:

reproducing signal generation means for outputting a reproducing audible signal;

ultrasonic signal generation means for outputting a carrier wave signal at a frequency in an ultrasonic band;

phase modulation means for phase modulating the carrier wave signal with the reproducing audible signal to output a modulated carrier wave signal; and diaphragm driving means for vibrating said diaphragm based on a compression cycle of the modulated carrier wave signal, wherein the carrier wave signal is a signal wave at a frequency of 40 kHz to 100 kHz.

2. The directional speaker according to claim 1, wherein said phase modulation means phase modulates the carrier wave signal with a modulation phase in a range from 0.1 rad to 25 rad.

3. The directional speaker according to claim 1 or 2 wherein said phase modulation means is first phase modulation means that carries out phase modulation by modulating the carrier wave with a differential signal of the reproducing audible signal.

4. The directional speaker according to claim 3 wherein said first phase modulation means comprises:

a differentiation circuit that differentiates the reproducing audible signal; and a frequency modulation circuit that frequency modulates the carrier wave signal with an output signal from said differentiation circuit.

5. The directional speaker according to claim 1 or 2 wherein said phase modulation means is second phase modulation means that modulates the carrier wave signal based on a slope of the reproducing audible signal.

6. The directional speaker according to claim 5 wherein said second phase modulation means modulates the carrier wave signal at a high density in a rising signal part of the reproducing audible signal and modulates the carrier wave signal at a low density in a falling signal part of the reproducing audible signal.

7. The directional speaker according to claim 6 wherein said second phase modulation means modulates the carrier wave signal at a high density based on a signal width of the rising part of the reproducing audible signal and modulates the carrier wave signal at a low density based on a signal width of the falling part of the reproducing audible signal.

8. The directional speaker according to claim 6 wherein said second phase modulation means modulates the carrier wave signal at a high density based on a rising rate of the rising part of the reproducing audible signal and modulates the carrier wave signal at a low density based on a falling rate of the falling part of the reproducing audible signal.

9. The directional speaker according to claim 6 wherein said second phase modulation means modulates the carrier wave signal only for the rising signal part of the reproducing audible signal.

10. The directional speaker according to claim 3 wherein the carrier wave signal is a rectangular wave at a frequency of 40 kHz to 100 kHz and a duty ratio of the rectangular wave is a value selected from a range 20% to 80%.

11. The directional speaker according to claim 4 wherein the carrier wave signal is a rectangular wave at a frequency of 40 kHz to 100 kHz and a duty ratio of the rectangular wave is a value selected from a range 20% to 80%.

12. The directional speaker according to claim 3 wherein the carrier wave signal is a periodic rectangular signal and the duty ratio of the rectangular wave is set to a ratio such that a sound pressure in the wavelength area of the reproducing audible signal is higher than a sound pressure of high-frequency components.

13. The directional speaker according to claim 4 wherein the carrier wave signal is a periodic rectangular signal and the duty ratio of the rectangular wave is set to a ratio such that a sound pressure in the wavelength area of the reproducing audible signal is higher than a sound pressure of high-frequency components.

14. The directional speaker according to claim 3, further comprising:

a filter, provided between said phase modulation means and said diaphragm driving means, for passing a predetermined frequency component of the modulated carrier wave signal, wherein the passing area of said filter is a frequency area that does not include a resonance point in sound pressure characteristics for the frequency of said diaphragm driving means.

15. The directional speaker according to claim 4, further comprising:

a filter, provided between said phase modulation means and said diaphragm driving means, for passing a predetermined frequency component of the modulated carrier wave signal, wherein the passing area of said filter is a frequency area that does not include a resonance point in sound pressure characteristics for the frequency of said diaphragm driving means.

16. The directional speaker according to claim 3, further comprising:

amplitude change means provided between said phase modulation means and said diaphragm driving means wherein, based on amplitude characteristics for the frequency of said amplitude change means, sound pressure characteristics for the frequency of said diaphragm driving means are changed to predetermined sound pressure characteristics.

17. The directional speaker according to claim 4, further comprising:

amplitude change means provided between said phase modulation means and said diaphragm driving means wherein, based on amplitude characteristics for the frequency of said amplitude change means, sound pressure characteristics for the frequency of said diaphragm driving means are changed to predetermined sound pressure characteristics.

18. A directional speaker that vibrates a diaphragm to send sound waves, comprising:

reproducing signal generation means for outputting a reproducing audible signal;

ultrasonic signal generation means for outputting a carrier wave signal at a frequency in an ultrasonic band;

phase modulation means for phase modulating the carrier wave signal with the reproducing audible signal to output a modulated carrier wave signal; and diaphragm driving means for vibrating said diaphragm based on a compression cycle of the modulated carrier wave signal, wherein the carrier wave signal is a rectangular wave at a frequency of 40 kHz to 100 kHz and a duty ratio of the rectangular wave is a value selected from a range 20% to 80%.

19. A directional speaker that vibrates a diaphragm to send sound waves, comprising:

reproducing signal generation means for outputting a reproducing audible signal;

ultrasonic signal generation means for outputting a carrier wave signal at a frequency in an ultrasonic band;

phase modulation means for phase modulating the carrier wave signal with the reproducing audible signal to output a modulated carrier wave signal;

diaphragm driving means for vibrating said diaphragm based on a compression cycle of the modulated carrier wave signal; and a filter, provided between said phase modulation means and said diaphragm driving means, for passing a predetermined frequency component of the modulated carrier wave signal, wherein the passing area of said filter is a frequency area that does not include a resonance point in sound pressure characteristics for the frequency of said diaphragm driving means, and the carrier wave signal is a signal wave at a frequency of 40 kHz to 100 kHz.

20. A directional speaker that vibrates a diaphragm to send sound waves, comprising:

reproducing signal generation means for outputting a reproducing audible signal;

ultrasonic signal generation means for outputting a carrier wave signal at a frequency in an ultrasonic band;

phase modulation means for phase modulating the carrier wave signal with the reproducing audible signal to output a modulated carrier wave signal;

diaphragm driving means for vibrating said diaphragm based on a compression cycle of the modulated carrier wave signal; and amplitude change means provided between said phase modulation means and said diaphragm driving means, wherein the amplitude change means changes an amplitude of the modulated carrier wave signal output from the phase modulation means based on a predetermined characteristic relationship between frequency and amplitude, thereby correcting sound pressure characteristics for the frequency of said diaphragm driving means to predetermined sound pressure characteristics, wherein the carrier wave signal is a signal wave at a frequency of 40 kHz to 100 kHz.

21. A method for driving a directional speaker that vibrates a diaphragm to send sound waves, comprising the steps of:

phase modulating a carrier wave signal at a frequency in an ultrasonic band with a reproducing audible signal output from reproducing signal generation means, said carrier wave signal being output by ultrasonic signal generation means, said phase modulation being carried out by phase modulation means that carries out first phase modulation in which the carrier wave is modulated with a differential signal of the reproducing audible signal, said first phase modulation being carried out by differentiating the reproducing audible signal and then frequency modulating the carrier wave signal with the differentiation signal; and vibrating said diaphragm based on a compression cycle of a modulated carrier wave signal obtained by said phase modulation, wherein the carrier wave signal is a signal wave at a frequency of 40 kHz to 100 kHz.

22. The method for driving a directional speaker according to claim 21 wherein said phase modulation means phase modulates the carrier wave signal with a modulation phase in a range from 0.1 rad to 25 rad.

23. The method for driving a directional speaker according to claim 21 or 22 wherein said phase modulation means carries out second phase modulation in which the carrier wave is modulated based on a slope of the reproducing audible signal.

24. The method for driving a directional speaker according to claim 23 wherein said second phase modulation is carried out by modulating the carrier wave signal at a high density in a rising signal part of the reproducing audible signal and modulating the carrier wave signal at a low density in a falling signal part of the reproducing audible signal.

25. The method for driving a directional speaker according to claim 24 wherein said second phase modulation is carried out by modulating the carrier wave signal at a high density based on a signal width of the rising part of the reproducing audible signal and modulating the carrier wave signal at a low density based on a signal width of the falling part of the reproducing audible signal.

26. The method for driving a directional speaker according to claim 24 wherein said second phase modulation is carried out by modulating the carrier wave signal at a high density based on a rising rate of the rising part of the reproducing audible signal and modulating the carrier wave signal at a low density based on a falling rate of the falling part of the reproducing audible signal.

27. The method for driving a directional speaker according to claim 23 wherein said second phase modulation is carried out by modulating the carrier wave signal only for a rising signal part of the reproducing audible signal.

28. The method for driving a directional speaker according to claim 21 wherein a duty ratio of the rectangular wave is a value selected from a range 20% to 80%.

29. The method for driving a directional speaker according to claim 22 wherein a duty ratio of the rectangular wave is a value selected from a range 20% to 80%.

30. The method for driving a directional speaker according to claim 21 wherein the carrier wave signal is a periodic rectangular signal and the duty ratio of the rectangular wave is set to a ratio such that a sound pressure in the wavelength area of the reproducing audible signal is higher than a sound pressure of high-frequency components.

31. The method for driving a directional speaker according to claim 22 wherein the carrier wave signal is a periodic rectangular signal and the duty ratio of the rectangular wave is set to a ratio such that a sound pressure in the wavelength area of the reproducing audible signal is higher than a sound pressure of high-frequency components.

32. The method for driving a directional speaker according to claim 21 wherein a predetermined frequency component that is included in the modulated carrier wave signal output by said phase modulation means and that does not include a resonance point in sound pressure characteristics for the frequency of said diaphragm driving means is passed and the diaphragm is vibrated by the modulated carrier wave signal of the predetermined frequency component.

33. The method for driving a directional speaker according to claim 22 wherein a predetermined frequency component that is included in the modulated carrier wave signal output by said phase modulation means and that does not include a resonance point in sound pressure characteristics for the frequency of said diaphragm driving means is passed and the diaphragm is vibrated by the modulated carrier wave signal of the predetermined frequency component.

34. The method for driving a directional speaker according to claim 21 wherein an amplitude of the modulated carrier wave signal output by said phase modulation means is changed and, based on frequency characteristics of the amplitude, sound pressure characteristics for the frequency of said diaphragm driving means, which drives said diaphragm, are changed to predetermined sound pressure characteristics.

35. The method for driving a directional speaker according to claim 22 wherein an amplitude of the modulated carrier wave signal output by said phase modulation means is changed and, based on frequency characteristics of the amplitude, sound pressure characteristics for the frequency of said diaphragm driving means, which drives said diaphragm, are changed to predetermined sound pressure characteristics.

36. A method for driving a directional speaker that vibrates a diaphragm to send sound waves, comprising the steps of:

phase modulating a carrier wave signal at a frequency in an ultrasonic band with a reproducing audible signal output from reproducing signal generation means, said carrier wave signal being output by ultrasonic signal generation means, said phase modulating including differentiating the reproducing audible signal and frequency modulating the carrier wave signal with the differentiated signal of the reproducing audible signal; and vibrating said diaphragm based on a compression cycle of a modulated carrier wave signal obtained by said phase modulating wherein the carrier wave signal is a rectangular wave at a frequency of 40 kHz to 100 kHz and a duty ratio of the rectangular wave is a value selected from a range 20% to 80%.

37. A method for driving a directional speaker that vibrates a diaphragm to send sound waves, comprising the steps of:

phase modulating a carrier wave signal at a frequency in an ultrasonic band with a reproducing audible signal output from reproducing signal generation means, said carrier wave signal being output by ultrasonic signal generation means, said phase modulating including differentiating the reproducing audible signal and frequency modulating the carrier wave signal with the differentiated signal of the reproducing audible signal;

vibrating said diaphragm based on a compression cycle of a modulated carrier wave signal obtained by said phase modulating; and filtering the modulated carrier wave signal to pass a predetermined frequency component that is included in the modulated carrier wave signal output by said phase modulation means and that does not include a resonance point in sound pressure characteristics for the frequency of diaphragm driving means and vibrating the diaphragm by the modulated carrier wave signal of the predetermined frequency component, wherein the carrier wave signal is a signal wave at a frequency of 40 kHz to 100 kHz.

38. A method for driving a directional speaker that vibrates a diaphragm to send sound waves, comprising the steps of:

phase modulating a carrier wave signal at a frequency in an ultrasonic band with a reproducing audible signal output from reproducing signal generation means, said carrier wave signal being output by ultrasonic signal generation means, said phase modulating including differentiating the reproducing audible signal and frequency modulating the carrier wave signal with the differentiated signal of the reproducing audible signal;

vibrating said diaphragm based on a compression cycle of a modulated carrier wave signal obtained by said phase modulating; and changing an amplitude of the modulated carrier wave signal output by said phase modulation means based on a predetermined characteristic relationship between frequency and amplitude, thereby correcting sound pressure characteristics for the frequency of diaphragm driving means, which drives said diaphragm, to predetermined sound pressure characteristics, wherein the carrier wave signal is a signal wave at a frequency of 40 kHz to 100 kHz.

* * * * *